(12) United States Patent
Kim et al.

(10) Patent No.: US 12,489,837 B2
(45) Date of Patent: Dec. 2, 2025

(54) ELECTRONIC DEVICE FORMED TO ADAPTIVELY OPEN AND CLOSE FOLDABLE HOUSING

(71) Applicant: SAMSUNG ELECTRONICS CO., LTD., Suwon-si (KR)

(72) Inventors: Hyeonseong Kim, Suwon-si (KR); Jeongmin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 378 days.

(21) Appl. No.: 18/310,739

(22) Filed: May 2, 2023

(65) Prior Publication Data

US 2023/0269316 A1 Aug. 24, 2023

Related U.S. Application Data

(63) Continuation of application No. PCT/KR2021/015915, filed on Nov. 4, 2021.

(30) Foreign Application Priority Data

Jan. 11, 2021 (KR) ........................ 10-2021-0003169

(51) Int. Cl.
*H04M 1/02* (2006.01)
(52) U.S. Cl.
CPC ....... *H04M 1/0216* (2013.01); *H04M 1/0243* (2013.01); *H04M 2250/12* (2013.01)
(58) Field of Classification Search
CPC ............. H04M 1/0216; H04M 1/0243; H04M 2250/12; H04M 1/0241; H04M 1/0268; F16C 11/04
See application file for complete search history.

(56) References Cited

U.S. PATENT DOCUMENTS 9,823,631 B1\* 11/2017 Loo ...................... G06F 1/1616
9,857,848 B2 1/2018 Liang et al.
(Continued)

FOREIGN PATENT DOCUMENTS

CN 111182100 A 5/2020
JP 2019067309 A 4/2019
(Continued)

OTHER PUBLICATIONS

Korean Office Action dated Jan. 7, 2025 for KR Application No. 10-2021-0003169.
(Continued)

*Primary Examiner* — Lewis G West
(74) *Attorney, Agent, or Firm* — Nixon & Vanderhye P.C.

(57) ABSTRACT

A portable electronic device may include: a foldable housing comprising a first housing and a second housing; a hinge assembly connecting the first housing and the second housing and enabling the first housing and the second housing to rotate; a sensor circuit; and a processor connected to the sensor circuit. The hinge assembly can comprise: at least one motor; and a detent for switching a first resistance state of the foldable housing to a second resistance state, in which resistance against the rotation is lower than that the first resistance state, by using power transferred from the at least one motor. The processor can: recognize that the foldable housing is being opened or closed on the basis of data received from the sensor circuit; and, on the basis of at least recognizing that the foldable housing is being opened or closed, control the at least one motor to switch the first resistance state of the foldable housing to the second resistance state. Various other embodiments are also possible.

15 Claims, 22 Drawing Sheets

(56) References Cited

U.S. PATENT DOCUMENTS

| | | | |
|---|---|---|---|
| 10,253,804 B2 | 4/2019 | Park et al. | |
| 10,401,917 B1 | 9/2019 | Dai et al. | |
| 10,452,106 B2 | 10/2019 | Cho et al. | |
| 11,009,921 B1* | 5/2021 | Bharadwaj | G06F 1/1694 |
| 2003/0153284 A1 | 8/2003 | Minami et al. | |
| 2004/0232723 A1* | 11/2004 | Sera | E05F 15/70 296/106 |
| 2006/0068859 A1 | 3/2006 | Lee et al. | |
| 2006/0133052 A1* | 6/2006 | Harmon | G06F 1/1616 361/752 |
| 2014/0047672 A1* | 2/2014 | Saito | H04M 1/0216 16/341 |
| 2014/0213325 A1* | 7/2014 | Kawasaki | G06F 1/1641 455/566 |
| 2014/0320435 A1 | 10/2014 | Modarres et al. | |
| 2015/0378557 A1 | 12/2015 | Jeong et al. | |
| 2016/0246330 A1 | 8/2016 | Kim et al. | |
| 2017/0255232 A1 | 9/2017 | Ram | |
| 2017/0272559 A1 | 9/2017 | Cavallaro et al. | |
| 2017/0292302 A1* | 10/2017 | Tomky | F16M 13/005 |
| 2017/0322597 A1 | 11/2017 | Lee et al. | |
| 2019/0011957 A1* | 1/2019 | Wendt | F16M 13/005 |
| 2019/0346890 A1* | 11/2019 | Kim | E05D 11/00 |
| 2020/0264666 A1 | 8/2020 | Itou | |
| 2020/0267244 A1 | 8/2020 | Kim et al. | |
| 2022/0374052 A1* | 11/2022 | Li | E05C 19/16 |
| 2023/0236635 A1* | 7/2023 | Liu | G06F 1/1624 361/679.21 |

FOREIGN PATENT DOCUMENTS

| | | | |
|---|---|---|---|
| KR | 10-2003-0068422 A | 8/2003 | |
| KR | 10-2005-0103719 A | 11/2005 | |
| KR | 100538337 B1 | 12/2005 | |
| KR | 20060021133 A | 3/2006 | |
| KR | 20160001628 A | 1/2016 | |
| KR | 20160002941 A | 1/2016 | |
| KR | 20160104177 A | 9/2016 | |
| KR | 20190108600 A | 9/2019 | |
| KR | 20200101251 A | 8/2020 | |
| KR | 10-2020-0137896 A | 12/2020 | |
| WO | 2016080559 A1 | 5/2016 | |
| WO | WO2016/203526 A1 | 12/2016 | |

OTHER PUBLICATIONS

International Search Report for PCT/KR2021/015915 mailed Feb. 11, 2022, 3 pages.
Written Opinion of the ISA for PCT/KR2021/015915 mailed Feb. 11, 2022, 4 pages.
Korean Decision to Grant dated Aug. 22, 2025 for KR Application No. 10-2021-0003169.

* cited by examiner

200

ELECTRONIC DEVICE FORMED TO ADAPTIVELY OPEN AND CLOSE FOLDABLE HOUSING

CROSS-REFERENCE TO RELATED APPLICATIONS

This application is a continuation of International Application No. PCT/KR2021/015915, designating the United States, filed on Nov. 4, 2021, in the Korean Intellectual Property Receiving Office, and claiming priority to KR Patent Application No. 10-2021-0003169 filed on Jan. 11, 2021, in the Korean Intellectual Property Office, the disclosures of all of which are hereby incorporated by reference herein in their entireties.

BACKGROUND

Field

Various example embodiments relate to an electronic device having a foldable housing capable of being folded and unfolded.

Description of Related Art

A foldable electronic device may include a foldable housing including a first housing and a second housing, a hinge assembly connecting the first housing and the second housing such that the second housing is rotatable relative to the first housing, and a flexible display disposed from one area of the first housing to at least one area of the second housing across the hinge assembly. The hinge assembly may be configured to have resistance against rotation of the foldable housing. Accordingly, the foldable housing may be fixed without shaking unless external force is applied thereto.

SUMMARY

Since a foldable housing is fixed by the resistance of a hinge assembly, it is possible to provide a user with a user experience enabling a foldable electronic device such as a laptop to be used while being mounted on a desk. However, the resistance makes it difficult to open and close the foldable housing by one hand.

In various example embodiments, an electronic device may have a structure that allows a user to easily open and close the foldable housing by lowering the resistance when opening and closing the foldable housing.

The technical problems to be solved in the disclosure is not limited to the technical problem mentioned above, and other technical problems not mentioned may be clearly understood by those skilled in the art to which the disclosure pertains from the description below.

In various example embodiments, a portable electronic device may include a foldable housing including a first housing and a second housing, a hinge assembly configured to connect the first housing and the second housing to be rotatable, a sensor circuit, and a processor connected, directly or indirectly, to the sensor circuit. The hinge assembly may include at least one motor and a detent structure configured to cause the foldable housing to switch from a first resistance state to a second resistance state in which resistance to the rotation is lower than that in the first resistance state using power transferred from the at least one motor. The processor may be configured to recognize that the foldable housing is opening or closing, based on data received from the sensor circuit, and, based at least on recognizing that the foldable housing is opening or closing, control the at least one motor to switch the foldable housing from the first resistance state to the second resistance state.

In various example embodiments, a portable electronic device may include a wireless communication circuit, a foldable housing including a first housing and a second housing, a hinge assembly configured to connect the first housing and the second housing to be rotatable, a sensor circuit, and a processor connected, directly or indirectly, to the wireless communication circuit and the sensor circuit. The hinge assembly may include at least one motor and a detent structure configured to cause the foldable housing to switch from a first resistance state to a second resistance state in which resistance to the rotation is lower than that in the first resistance state using power transferred from the at least one motor. The processor may be configured to control the at least one motor to switch the foldable housing from the first resistance state to the second resistance state as a call request message is received from an external device through the wireless communication circuit and control the at least one motor to switch the foldable housing from the second resistance state to the first resistance state, based data received from the sensor circuit.

According to various example embodiments, a user may easily open or close the foldable housing. In addition, various effects identified directly or indirectly through this document may be provided.

BRIEF DESCRIPTION OF DRAWINGS

In connection with description of drawings, identical or similar components may be given similar or identical reference numerals.

DETAILED DESCRIPTION

Figure 1:
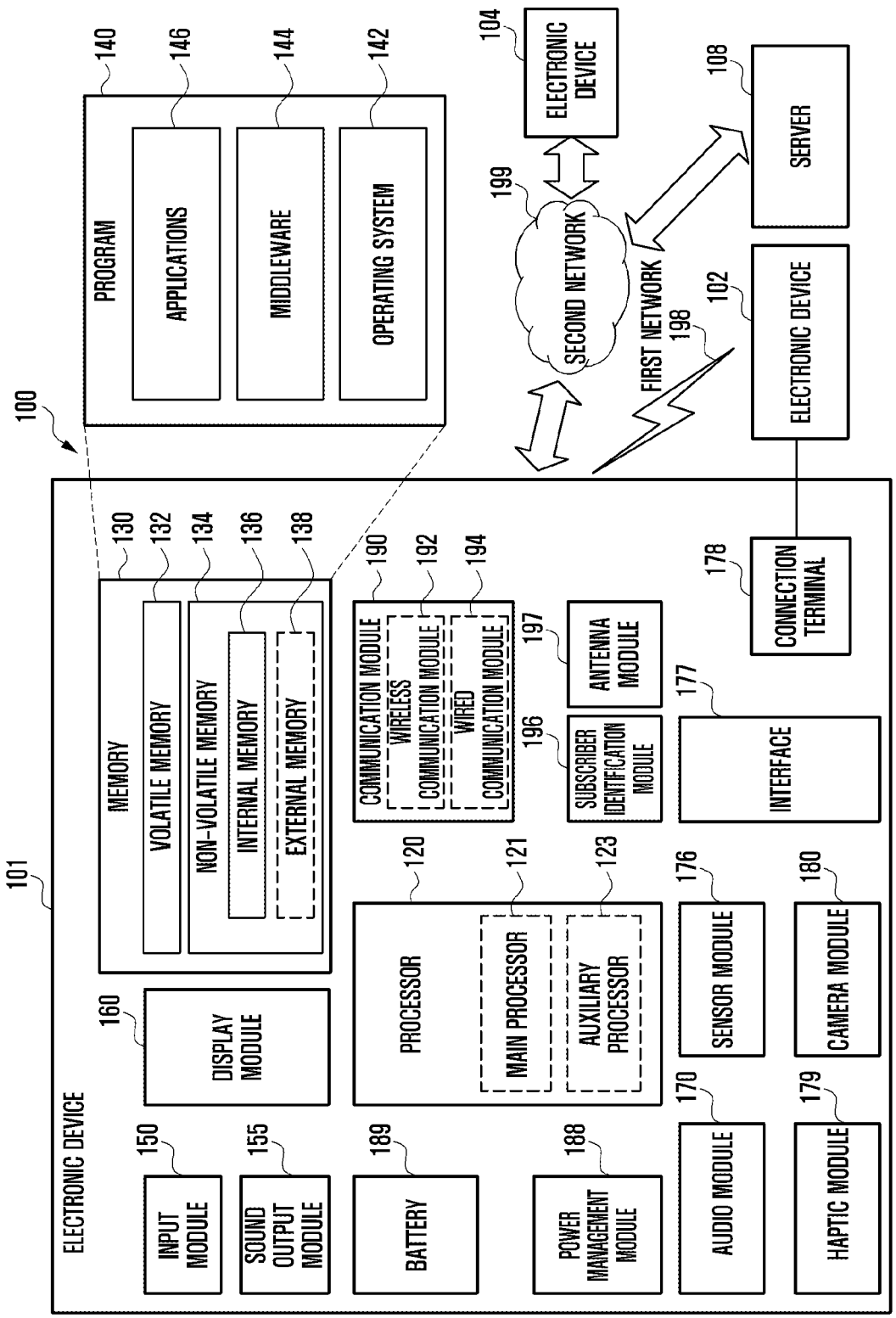
FIG. 1 is a block diagram of an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160). Each "module" herein may comprise circuitry.

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, a portable electronic device (e.g., the electronic device 101 in FIG. 1) may have a foldable housing divided into two housings based on a folding axis. A first portion of a display (e.g., a flexible display) may be disposed in a first housing, and a second portion of the display may be disposed in a second housing. The foldable housing may be implemented by an in-folding type in which the first portion and the second portion face each other when the portable electronic device is folded. Alternatively, the foldable housing may be implemented by an out-folding type in which the first portion and the second portion face in the opposite directions when the portable electronic device is folded. The surface in which the first portion and the second portion of the display are disposed may be a front surface of the portable electronic device, the opposite surface thereof may be a rear surface of the portable electronic device, and the surface surrounding a space between the front surface and the rear surface may be a side surface of the portable electronic device.

According to various embodiments, although the in-folding type in which the first portion of the display in the first housing is disposed to face the second portion of the display in the second housing when folding the display of the portable electronic device is illustrated and described by way of example, this may also be equally applied to the out-folding type in which the first portion of the display in the first housing 210 is disposed to face in the opposite direction of the second portion of the display in the second housing when folding the display according to an embodiment. In addition, the embodiments may be applied to a multi-foldable electronic device configured as a combination of an in-folding type and an in-folding type, a combination of an in-folding type and an out-folding type, and a combination of an out-folding type and an out-folding type.

Figure 2A:
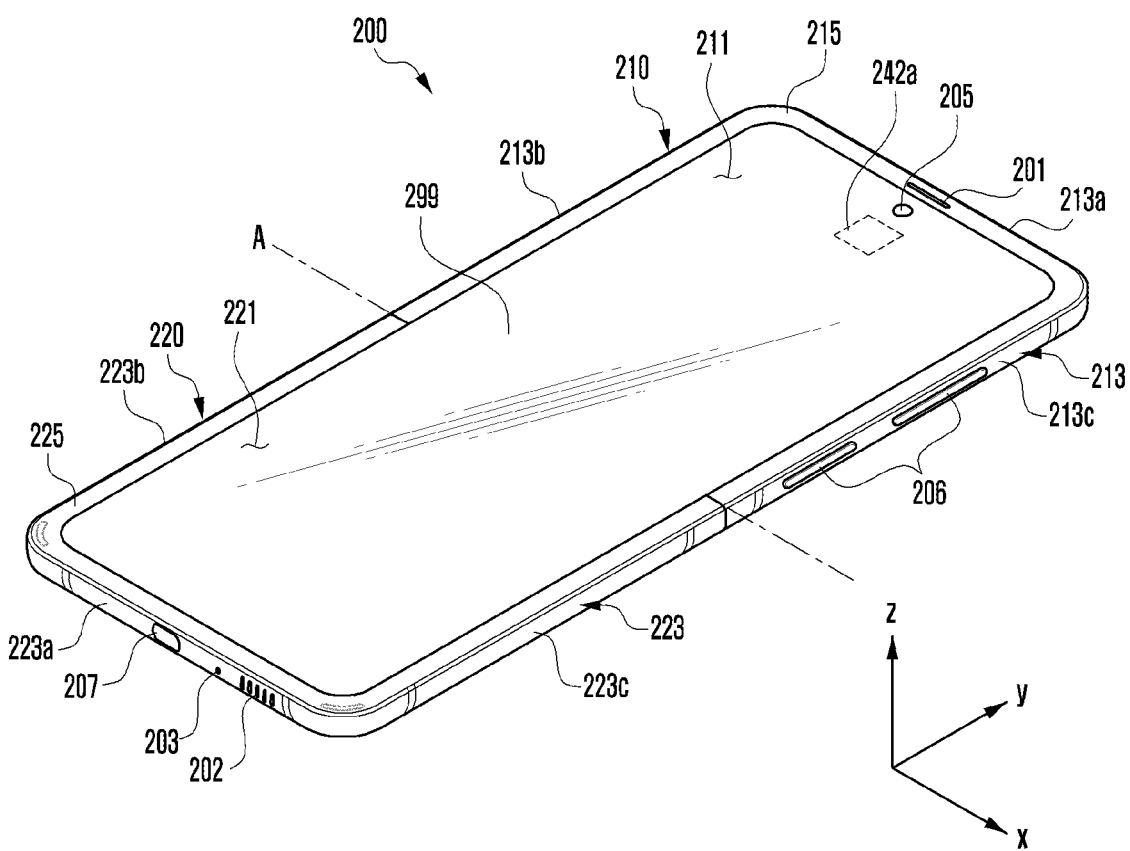
FIGS. 2A to 2F illustrate a portable electronic device having an in-folding housing structure according to an example embodiment.
Figure 2B:
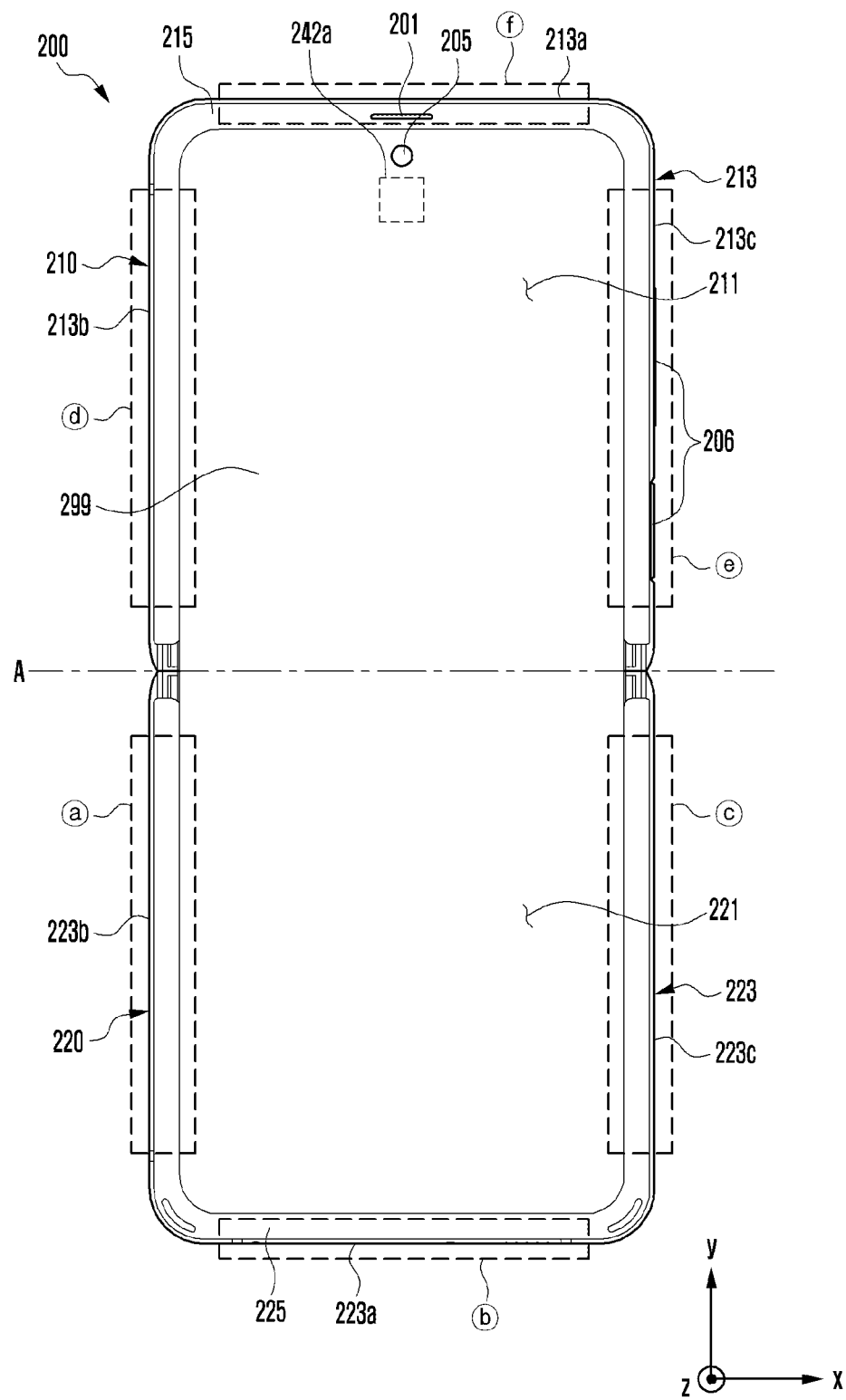
Figure 2C:
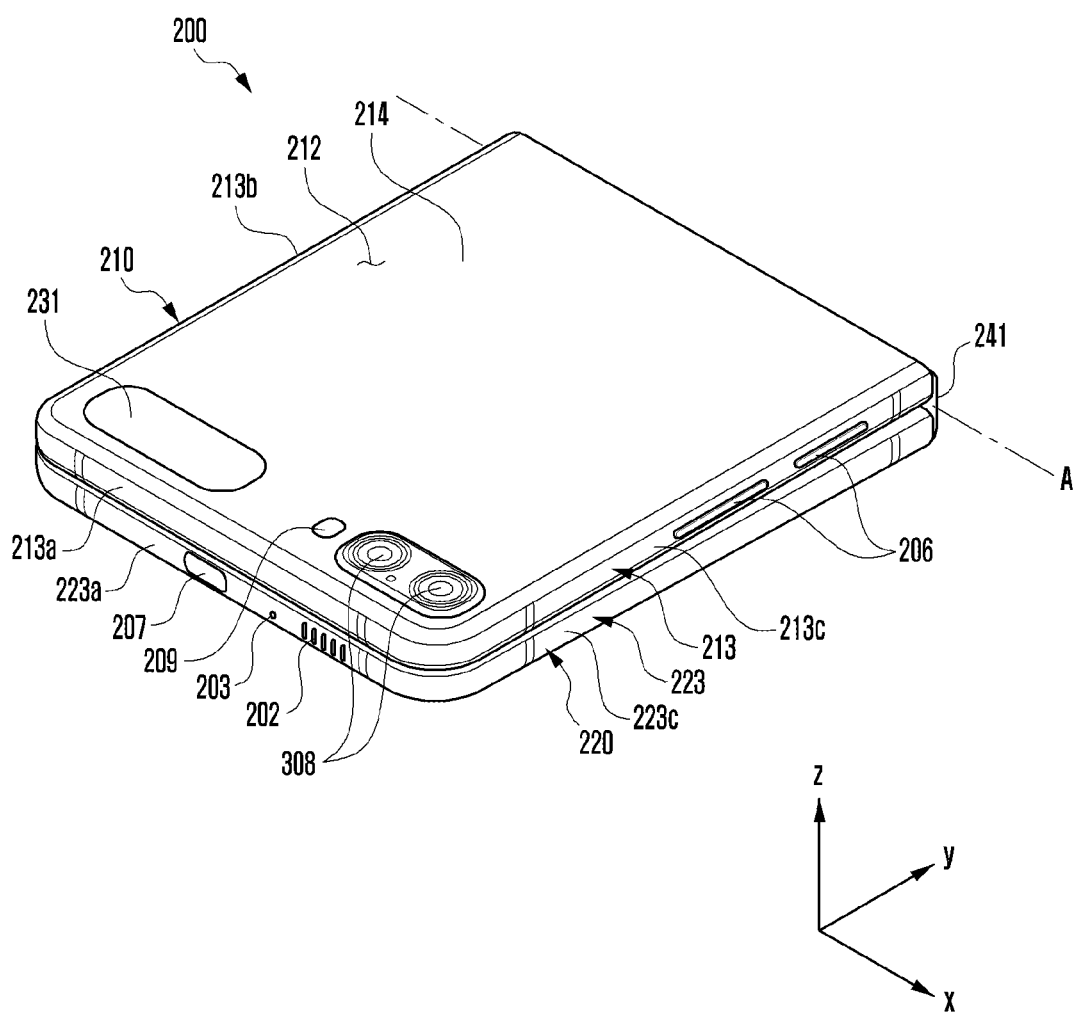
Figure 2D:
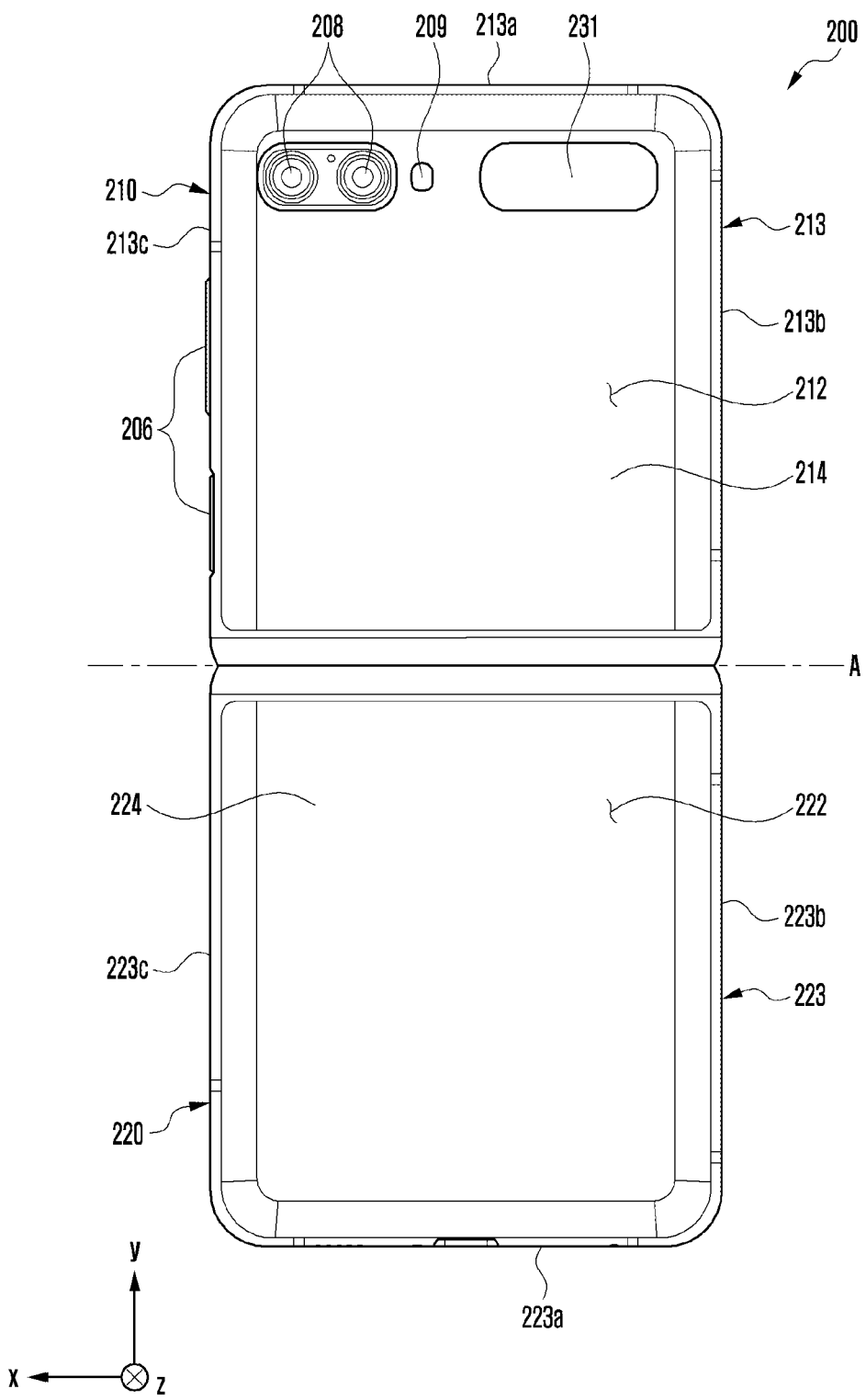
Figure 2E:
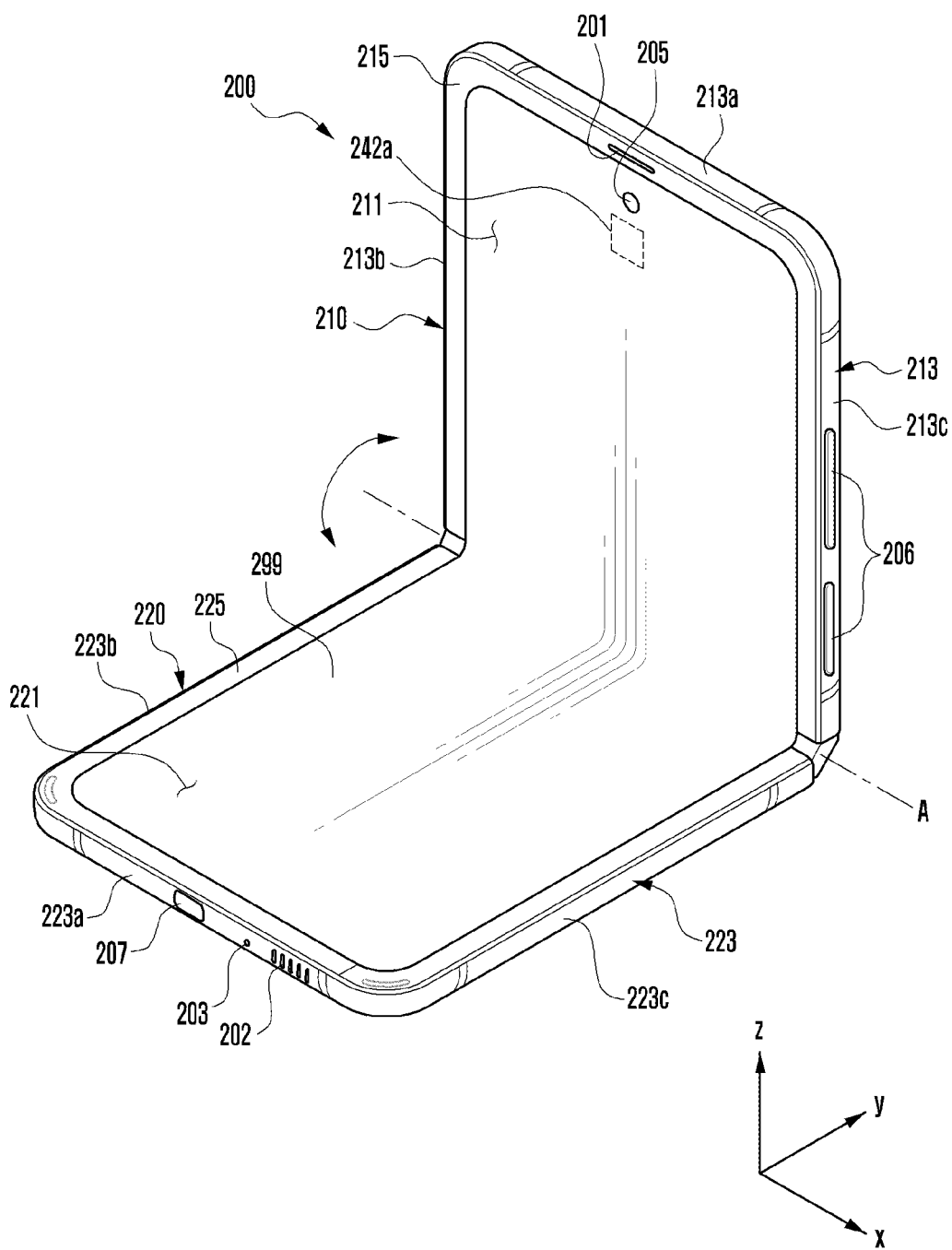
Figure 2F:
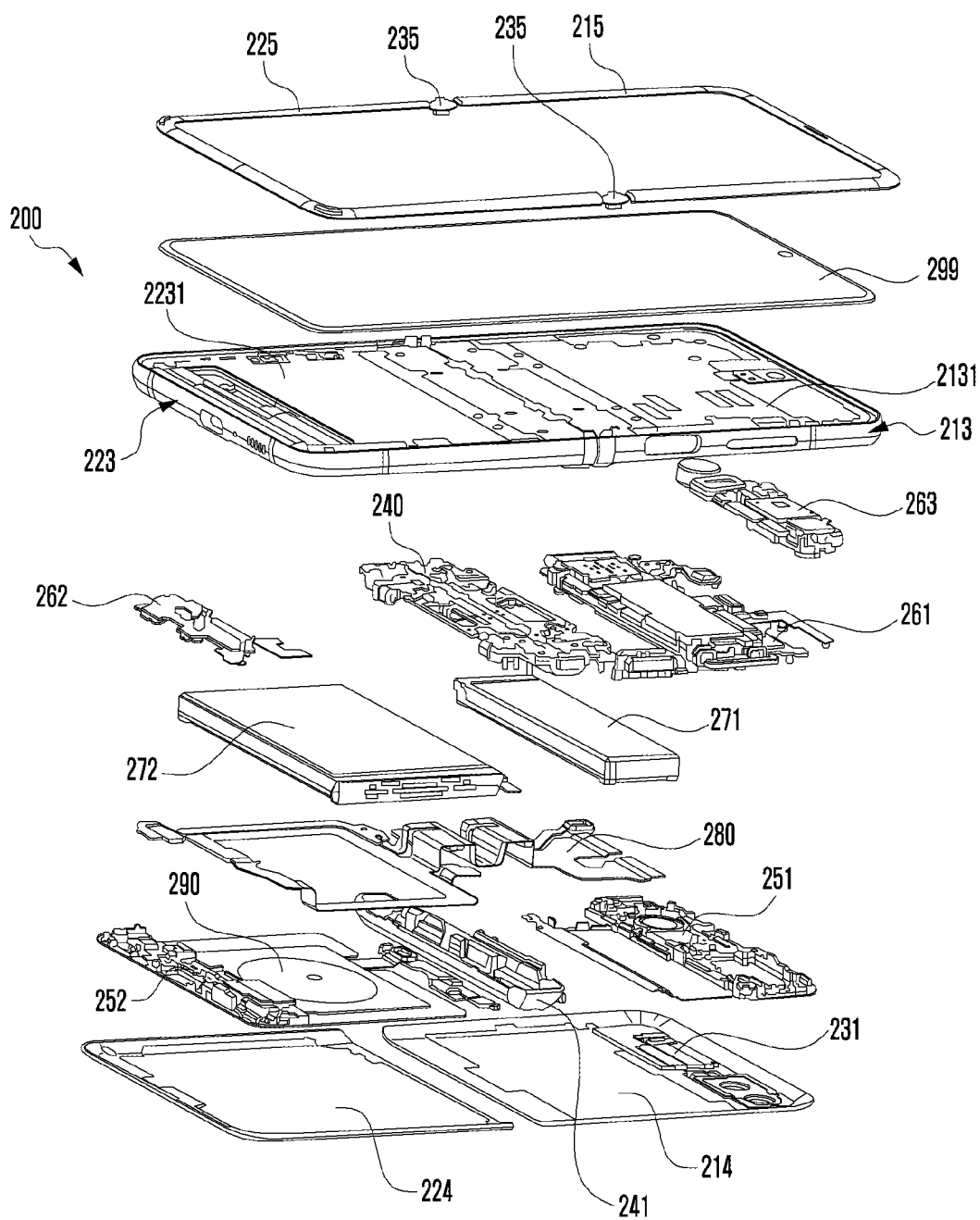

FIGS. 2A to 2F illustrate a portable electronic device 200 having an in-folding type housing structure according to an embodiment. Specifically, FIGS. 2A and 2B illustrate a front surface of a foldable portable electronic device (hereinafter simply an electronic device) in an unfolded (unfolded, flat, or open) state according to various embodiments, FIG. 2C illustrates a rear surface of the electronic device in a folded (or closed) state, FIG. 2D illustrates a rear surface of the electronic device in an unfolded state, FIG. 2E illustrates a front surface of the electronic device a partially folded state (in other words, a partially unfolded state or an intermediate state (free stop) state between a fully folded state and a fully unfolded state), and FIG. 2F is an exploded perspective view of an electronic device.

Referring to FIGS. 2A to 2F, a portable electronic device 200 (e.g., the electronic device 101 in FIG. 1) may include a first housing 210, a second housing 220, a hinge assembly 240 connecting the first housing 210 and the second housing 220 such that the second housing 220 is rotatable relative to the first housing 210, a flexible or foldable display 299 disposed in a space formed by the foldable housings 210 and 220, and a sensor module (e.g., the sensor module 176 in FIG. 1).

The display 299 may be disposed from the first housing 210 to the second housing 220 across the hinge assembly 240. The display 299 may be divided into a first display area 211 disposed in the inner space of the first housing 210 and a second display area 221 disposed in the inner space of the second housing 220, based on the folding axis A. The sensor module (e.g., an illuminance sensor) may be disposed below a sensor area (or a light transmission area) 242a of the first display area 211, when viewing the front surface. The location and/or size of the sensor area 242a in the first display area 211 may be determined by the location and/or size of an illuminance sensor disposed below the same. For example, the size (e.g., the diameter) of the sensor area 242a may be determined based on a field of view (FOV) of the illuminance sensor. In an embodiment, the sensor area 242a may be configured to have a lower pixel density and/or a lower wiring density than that in the surrounding areas in order to improve light transmittance.

The hinge assembly 240 may be implemented in an in-folding type in which the two display areas 211 and 221 face each other when the portable electronic device 200 switches from an unfolded state (e.g., the state in FIG. 2A) to a folded state (e.g., the state in FIG. 2C). For example, the two display areas 211 and 221 may face in the substantially same direction when the electronic device 200 is in the unfolded state. When switching from the unfolded state to the folded state, the two display areas 211 and 221 may be rotated in the direction to face each other. The hinge assembly 240 may be configured to have resistance to the rotation of the foldable housings 210 and 220. When an external force exceeding the resistance is applied to the foldable housings 210 and 220, the foldable housings 210 and 220 may be rotated.

The state of the electronic device 200 may be based on an angle formed between the two display areas 211 and 221. For example, the state of the electronic device 200 may be an unfolded (flat or open) state when the angle between the two display areas 211 and 221 is about 180 degrees. When the angle between the two display areas 211 and 221 is between about 0 degrees and 10 degrees, the state of the portable electronic device 200 may be a folded (or closed) state. When the two display areas 211 and 221 form an angle (e.g., between about 10 degrees and 179 degrees) greater than the angle in the folded state and smaller than the angle in the unfolded state, the state of the portable electronic device 200 may be an intermediate state (e.g., a partially folded or partially unfolded state) as shown in FIG. 2E.

Based on the state of the portable electronic device 200, an active area in which visual information (e.g., text, images, or icons) is to be displayed on the display 299 may be determined. For example, when the electronic device 200 is in the intermediate state, the active area may be determined as the first display area 211 or the second display area 221. One of the first display area 211 and the second display area 221, which exhibits relatively less motion, may be determined as the active area. For example, if the user, while gripping an housing of the electronic device 200 by one hand, opens the other housing by a finger (e.g., the thumb) of the same hand or by the other hand, the electronic device 200 may switch from the folded state to the intermediate state, and accordingly, the electronic device 200 may determine the display area of the gripped housing (e.g., the housing with relatively less motion) to be the active area. When the portable electronic device 200 is in the unfolded state, the entire area of the display 299 (e.g., both the first display area 211 and the second display area 221) may be determined as the active area.

According to various embodiments, in the unfolded state, the first housing 210 may include a first surface (first display area) 211 facing in a first direction (e.g., the front direction) (the z-axis direction) and a second surface 212 facing in a second direction (e.g., the rear direction) (the −z-axis direction) opposite the first surface 211. In the unfolded state, the second housing 220 may include a third surface (second display area) 221 facing in the first direction (e.g., the z-axis direction) and a fourth surface 222 facing in the second direction (e.g., the −z-axis direction). The electronic device 200 may operate such that the first surface 211 of the first housing 210 and the third surface 221 of the second housing 220 face in the same first direction (e.g., the z-axis direction) in the unfolded state and such that the first surface 211 and the third surface 221 face each other in the folded state. The electronic device 200 may operate such that the second surface 212 of the first housing 210 and the fourth surface 222 of the second housing 220 face in the same second direction (the −z-axis direction) in the unfolded state and such that the second surface 212 and the fourth surface 222 face in the opposite directions to each other in the folded state.

According to various embodiments, the first housing 210 may include a first side frame 213 that at least partially forms the exterior of the electronic device 200 and a first rear cover 214 that is coupled to the first side frame 213 and forms at least a portion of the second surface 212 of the electronic device 200. According to an embodiment, the first side frame 213 may include a first side surface 213a, a second side surface 213b extending from one end of the first side surface 213a, and a third side surface 213c extending from the other end of the first side surface 213a. According to an embodiment, the first side frame 213 may be formed in a rectangular shape (e.g., a square shape) by the first side surface 213a, the second side surface 213b, and the third side surface 213c.

A portion of the first side frame 213 may be formed of a conductor. For example, referring to FIG. 2B, a portion ⓕ of the first side surface 213a, a portion ⓓ of the second side surface 213b, and a portion ⓔ of the third side surface 213c may be formed of a metal material. The conductor may be electrically connected, directly or indirectly, to a grip sensor (not shown) disposed adjacent thereto in the inner space of the first housing 210. The processor (comprising processing circuitry) may measure capacitance formed between the conductor and the ground (e.g., the ground of a main printed circuit board) through the grip sensor and, based on the measured capacitance value, recognize a dielectric object (e.g., fingers, a palm, or a face) approaching (or contacting) the first housing 210 and contact points (e.g., the first side surface 213a, the second side surface 213b, and the third side surface 213c) between the dielectric object and the first housing 210.

According to various embodiments, the second housing 220 may include a second side frame 223 that at least partially form the exterior of the electronic device 200 and a second rear cover 224 that is coupled to the second side frame 223 and forms at least a portion of the fourth surface 222 of the electronic device 200. According to an embodiment, the second side frame 223 may include a fourth side surface 223a, a fifth side surface 223b extending from one end of the fourth side surface 223a, and a sixth side surface 223c extending from the other end of the fourth side surface 223b. According to an embodiment, the second side frame 223 may be formed in a rectangular shape by the fourth side surface 223a, the fifth side surface 223b, and the sixth side surface 223c.

A portion of the second side frame 223 may be formed of a conductor. For example, referring to FIG. 2B, a portion ⓑ of the fourth side surface 223a, a portion ⓐ of the fifth side surface 223b, and a portion ⓒ of the sixth side surface 223c may be formed of a metal material. The conductor may be electrically connected to a grip sensor (not shown) that is disposed adjacent thereto in the inner space of the second housing 220. The processor may measure capacitance formed between the conductor and the ground (e.g., the ground of a main printed circuit board) through the grip sensor and, based on the measured capacitance value, recognize a dielectric object approaching (or contacting) the second housing 220 and contact points (e.g., the fourth side surface 223a, the fifth side surface 223b, and the sixth side surface 223c) between the dielectric object and the second housing 220.

According to various embodiments, a pair of housings 210 and 220 are not limited to the illustrated shapes and couplings, and may be implemented by combinations and/or couplings of other shapes or components. For example, the first side frame 213 may be integrally formed with a first rear cover 214, and the second side frame 223 may be integrally formed with a second rear cover 224.

According to various embodiments, the first rear cover 214 and the second rear cover 224 may be formed of, for example, at least one of coated or tinted glass, ceramic, polymer, or metal {e.g., aluminum, stainless steel (STS), or magnesium} or a combination of at least two of them.

According to various embodiments, the electronic device 200 may include a first protective cover 215 (e.g., a first protective frame or a first decorative member) coupled along the edge of the first housing 210. The electronic device 200 may include a second protective cover 225 (e.g., a second protective frame or a second decorative member) coupled, directly or indirectly, along the edge of the second housing 220. According to an embodiment, the first protective cover 215 and the second protective cover 225 may be formed of a metal or polymer material.

According to various embodiments, the electronic device 200 may include a sub-display 231 disposed separately from the display 299. According to an embodiment, the sub-display 231 may be disposed to be at least partially exposed to the second surface 212 of the first housing 210 so as to display state information of the electronic device 200 in the folded state. According to an embodiment, the sub-display 231 may be disposed to be visible from the outside through at least partial area of the first rear cover 214. In some embodiments, the sub-display 231 may be disposed on the fourth surface 224 of the second housing 220. In this case, the sub-display 231 may be disposed to be visible from the outside through at least partial area of the second rear cover 224.

According to various embodiments, the electronic device 200 may include at least one of an input device 203, sound output devices 201 and 202, camera modules 205 and 208, a key input device 206, a connector port 207, and a sensor module (not shown). In an embodiment, the sensor module (e.g., the sensor module 176 in FIG. 1) and the camera 205 may be disposed below the display 299 when viewing the front surface thereof.

According to various embodiments, the electronic device 200 may operate to maintain the intermediate state through the hinge assembly 240. In this case, the electronic device 200 may control the display 299 to display different pieces of content between the display area corresponding to the first surface 211 and the display area corresponding to the third surface 221.

Referring to FIG. 2F, the electronic device 200 according to various embodiments may include a first side frame 213, a second side frame 223, and a hinge assembly 240 connecting the first side frame 213 and the second side frame 223 so as to be rotatable. According to an embodiment, the electronic device 200 may include a first support plate 2131 at least partially extending from the first side frame 213 and a second support plate 2231 at least partially extending from the second side frame 223. According to an embodiment, the first support plate 2131 may be integrally formed with the first side frame 213 or structurally coupled to the first side frame 213. Similarly, the second support plate 2231 may be integrally formed with the second side frame 223 or structurally coupled, directly or indirectly, to the second side frame 223. According to an embodiment, the electronic device 200 may include a display 299 disposed to be supported by the first support plate 2131 and the second support plate 2231. According to an embodiment, the electronic device 200 may include a first rear cover 214 that is coupled to the first side frame 213 and provides a first space between the first support plate 2131 and the same, and a second rear cover 224 that is coupled to the second side frame 223 and provides a second space between the second support plate 2231 and the same. In some embodiments, the first side frame 213 and the first rear cover 214 may be integrally formed. In some embodiments, the second side frame 223 and the second rear cover 224 may be integrally formed. According to an embodiment, the electronic device 200 may include a first housing 210 provided by the first side frame 213, the first support plate 2131, and the first rear cover 214. According to an embodiment, the electronic device 200 may include a second housing 220 provided by the second side frame 223, the second support plate 231, and the second rear cover 224.

Although not shown, the hinge assembly 240 may include a first arm structure coupled to the first housing 210 (e.g., the first support plate 2231), a second arm structure coupled to the second housing 220 (e.g., the second support plate 2232), and a detent structure physically in contact with the first arm structure and the second arm structure such that the first housing 210 and the second housing 220 have rotational resistance. The foldable housings 210 and 220 may have rotational resistance by a contact force of the detent structure (e.g., a force pushing the first arm structure and the second arm structure).

According to various embodiments, the electronic device 200 may include a first board assembly 261 (e.g., a main printed circuit board), a camera assembly 263, a first battery 271, or a first bracket 251, which is disposed in a first space between the first side frame 213 and the first rear cover 214. According to an embodiment, the camera assembly 263 may include a plurality of cameras (e.g., the camera modules 205 and 208 in FIGS. 2A and 2C) and may be electrically connected, directly or indirectly, to the first board assembly 261. According to an embodiment, the first bracket 251 may provide a support structure and improved rigidity for supporting the first board assembly 261 and/or the camera assembly 263. According to an embodiment, the electronic device 200 may include a second board assembly 262 (e.g., a sub-printed circuit board), an antenna 290 (e.g., a coil member), a second battery 272, or a second bracket 252, which is disposed in a second space between the second side frame 223 and the second rear cover 224. According to an embodiment, the electronic device 200 may include a wiring member 280 (e.g., a flexible printed circuit board (FPCB)) that is disposed to extend across the hinge assembly 240 from the first board assembly 261 to a plurality of electronic components (e.g., the second board assembly 262, the second battery 272, or the antenna 290) disposed between the second side frame 223 and the second rear cover 224 and provides an electrical connection.

According to various embodiments, the electronic device 200 may include a hinge cover 241 that supports the hinge assembly 240 and is disposed to be exposed to the outside when the electronic device 200 is in the folded state and to be invisible from the outside by being inserted into the first space and the second space when the electronic device 200 is in the unfolded state.

According to various embodiments, the electronic device 200 may include a first protective cover 215 coupled along the edge of the first side frame 213. According to an embodiment, the electronic device 200 may include a second protective cover 225 coupled along the edge of the second side frame 223. The edge of the first display area 211 of the display 299 may be protected by the first protective cover 215. The edge of the second display area 221 may be protected by the second protective cover 225. A protective cap 235 may be disposed in the area corresponding to the hinge assembly 240 so as to protect a bent portion of the edge of the display 299.

Figure 3A:
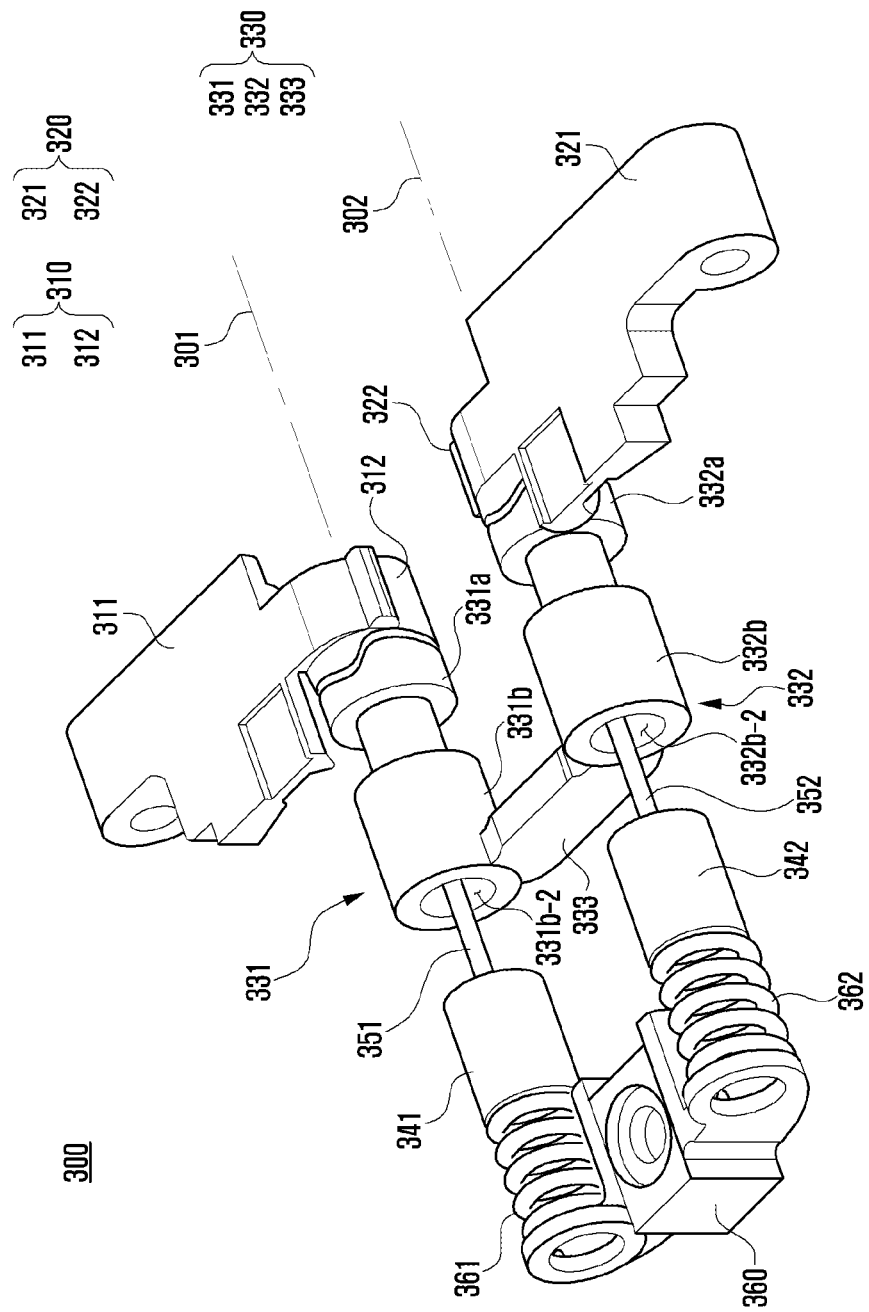
FIGS. 3A, 3B, and 3C illustrate a structure of a hinge assembly configured to adjust resistance of a foldable housing according to an example embodiment.
Figure 3B:
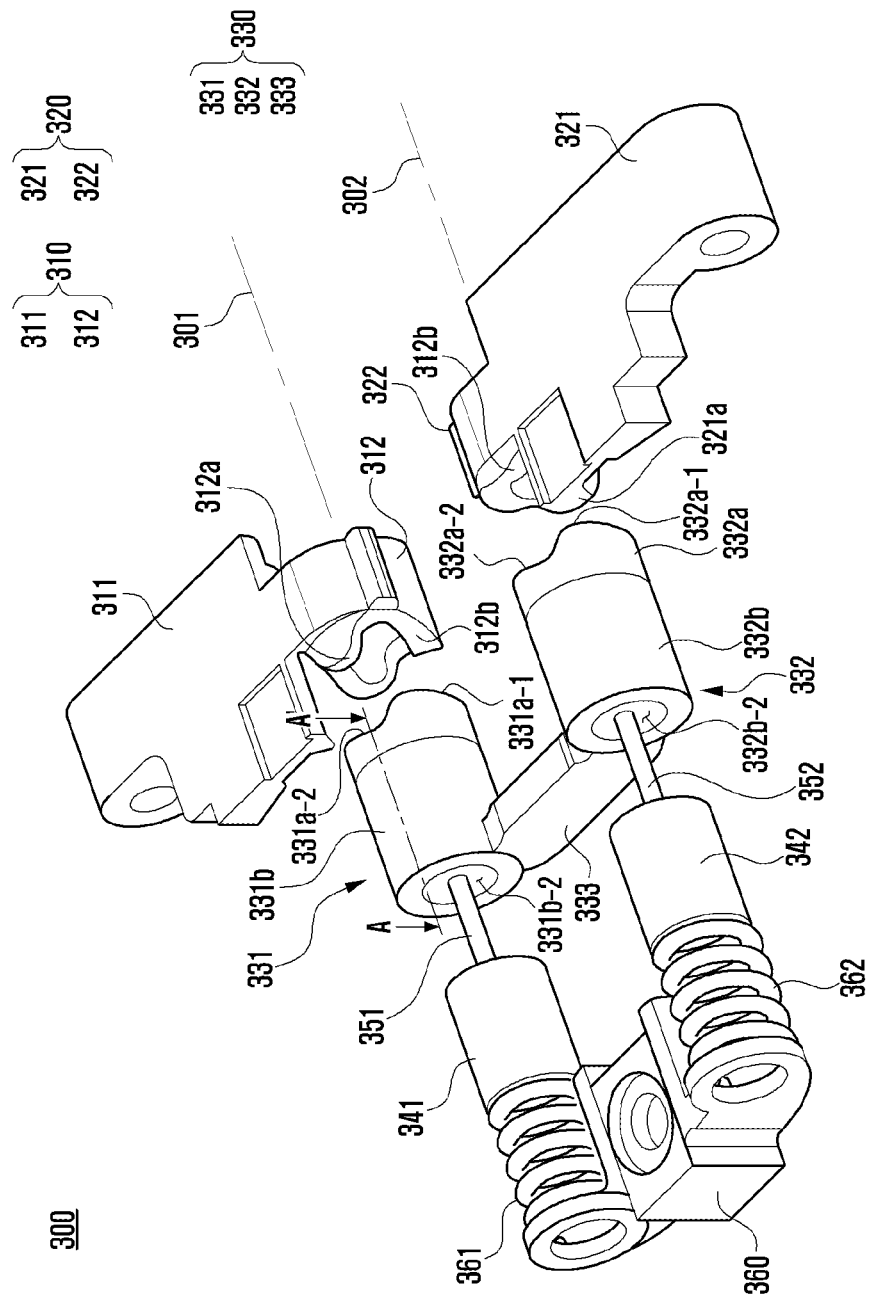
Figure 3C:
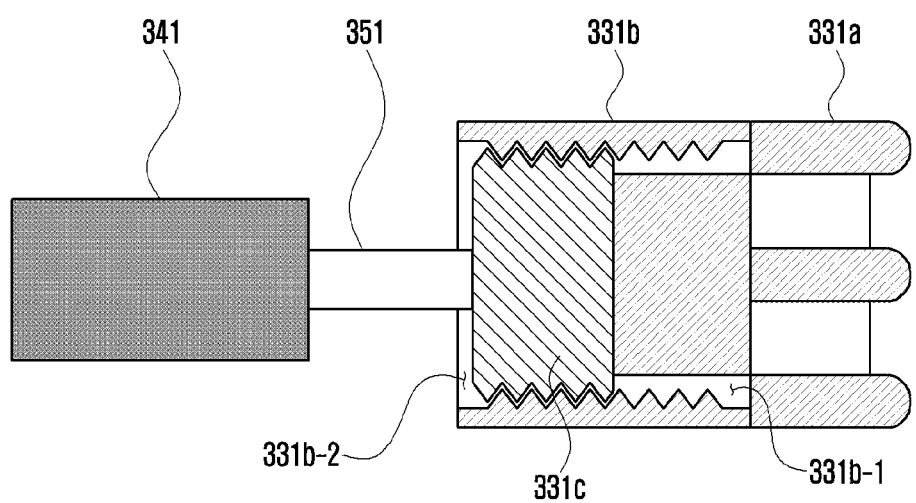

FIGS. 3A, 3B, and 3C illustrate a structure of a hinge assembly 300 configured to adjust resistance of a foldable housing according to an embodiment. The hinge assembly 300 (e.g., the hinge assembly 240 in FIG. 2F) may include a first arm structure 310, a second arm structure 320, a detent structure 330, a first motor 341, a second motor 342, a first spring 361, a second spring 362, and a support member 360.

The first arm structure 310 may include a first coupling member 311 coupled to the first housing 210 (e.g., the first support plate 2231) and a first cam 312 that extends from the first coupling member 311 and rotates about a first axis 301. The second arm structure 320 may include a second coupling member 321 coupled to the second housing 220 (e.g., the second support plate 2232) and a second cam 322 that extends from the second coupling member 321 and rotates about a second axis 302 that is parallel to the first axis 301.

The detent structure 330 may include a first detent part 331, a second detent part 332, and a connection member 333 for connecting and fixing the two detent parts 331 and 332.

The first detent part 331 may be configured to come into contact with the first cam 312 along the first axis 301, thereby restricting rotation of the first cam 312 as shown in FIG. 3A, and to be separated from the first cam 312, thereby enabling free rotation of the first cam 312 as shown in FIG. 3B. The first housing 210 may have the rotational resistance due to the frictional force according to the contact between the first detent part 331 and the first cam 312. When the first detent part 331 is separated from the first cam 312, the rotational resistance may be reduced, so that the user may easily rotate the first housing 210.

The second detent part 332 may be configured to come into contact with the second cam 322 along the second axis 302, thereby restricting rotation of the second cam 322 as shown in FIG. 3A, and to be separated from the second cam 322, thereby enabling free rotation of the second cam 322 as shown in FIG. 3B. The second housing 220 may have the rotational resistance due to the frictional force according to the contact between the second detent part 332 and the second cam 322. When the second detent part 332 is separated from the second cam 322, the rotational resistance may be reduced, so that the user may easily rotate the second housing 220.

According to an embodiment, the first detent part 331 may include a first contact portion 331a, a first nut portion 331b in which the female thread is formed on the cylindrical inner wall thereof, and a first bolt portion 331c in which the male thread is formed on the cylindrical outer wall thereof so as to be screwed to the first nut portion 331b. The first bolt portion 331c may be coupled to the first contact portion 331a through a 1-1st opening 331b-1 of the first nut portion 331b. The first bolt portion 331c may be coupled to a first shaft 351, which transfers the power of the first motor 341 to the first bolt portion 331c, through a 1-2nd opening 331b-2 formed on the opposite side of the 1-1st opening 331b-1. The first bolt portion 331c may move toward the first cam 312 while being rotated by the power transferred from the first motor 341 through the first shaft 351 so that the first contact portion 331a comes into contact with the first cam 312. The first bolt portion 331c may move in the opposite direction of the first cam 312 while being reversely rotated by the power transferred from the first motor 341 through the first shaft 351 so that the first contact portion 331a is separated from the first cam 312.

According to an embodiment, the second detent part 332 may include a second contact portion 332a, a second nut portion 332b in which the female thread is formed on the cylindrical inner wall thereof, and a second bolt portion (not shown) in which the male thread is formed on the cylindrical outer wall thereof so as to be screwed to the second nut portion 332b. The second bolt portion may be coupled to the second contact portion 332a through a 2-1st opening (not shown) of the second nut portion 332b. The second bolt portion may be coupled to a second shaft 352, which transfers the power of the second motor 342 to the second bolt portion, through a 2-2nd opening 332b-2 formed on the opposite side of the 2-1st opening. The second bolt portion may move toward the second cam 322 while being rotated by the power transferred from the second motor 342 through the second shaft 352 so that the second contact portion 332a comes into contact with the second cam 322. The second bolt portion may move in the opposite direction of the second cam 322 while being reversely rotated by the power transferred from the second motor 342 through the second shaft 352 so that the second contact portion 332a is separated from the second cam 322.

According to an embodiment, the portion of the first cam 312 facing the first contact portion 331a may be formed in a concavo-convex structure in which peaks 312a and valleys 312b are repeated. The portion of the first contact portion 331a that comes into contact with the first cam 312 may also be formed in a concavo-convex structure in which peaks 331a-1 and valleys 331a-2 are repeated corresponding thereto. The first spring 361 may be disposed between the support member 360 and the first motor 341 to provide an elastic force to the first detent part 331 when the first contact portion 331a of the first detent part 331 comes into contact with the first cam 312 as shown in FIG. 3A. The first housing 210 may be rotated by an external force exceeding the resistance provided from the first detent part 331 to the first housing 210 due to the elastic force and the contact between the first contact portion 331a and the first cam 312. As shown in FIG. 3B, when the first contact portion 331a is separated from the first cam 312, the first detent part 331 may not interfere with the rotation of the first housing 210 so that the first housing 210 may rotate relatively freely.

According to an embodiment, the portion of the second cam 322 facing the second contact portion 332a may be formed in a concavo-convex structure in which peaks 322a and valleys 322b are repeated. The portion of the second contact portion 332a that comes into contact with the second cam 322 may also be formed in a concavo-convex structure in which peaks 332a-1 and valleys 332a-2 are repeated corresponding thereto. A second spring 362 may be disposed between the support member 360 and the second motor 342 to provide an elastic force to the second detent part 332 when the second contact portion 332a of the second detent part 332 comes into contact with the second cam 322 as shown in FIG. 3A. The second housing 220 may be rotated by an external force exceeding the resistance provided from the second detent part 332 to the second housing 220 due to the elastic force and the contact between the second contact portion 332a and the second cam 322. As shown in FIG. 3B, when the second contact portion 332a is separated from the second cam 322, the second detent part 332 may not interfere with the rotation of the second housing 220 so that the second housing 220 may rotate relatively freely.

According to an embodiment, when the contact portions 331a and 332a come into contact with the cams 312 and 322, the concavo-convex structures of the contact portions 331a and 332a and the concavo-convex structures of the cams 312 and 322 may be fixed in a dislocated state, instead of meshing with each other. For example, the peaks of the contact portions 331a and 332a may come into contact with the peaks instead of the valleys of the cams 312 and 322. An operation of repeating rotation and reverse rotation of the motors 341 and 342 may be performed in order for the two concavo-convex structures to return to their original meshed state. For example, the processor of the electronic device may perform the above operation by controlling the motors 341 and 342 when the foldable housing is in the folded state.

Figure 4A:
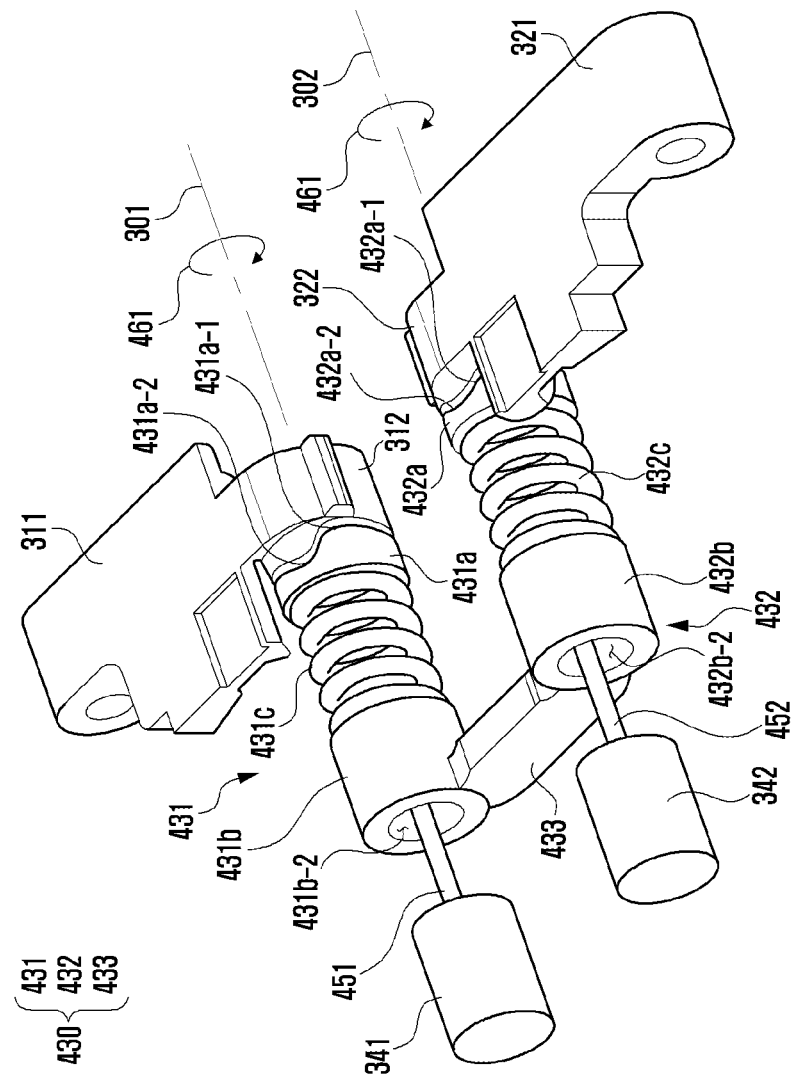
FIGS. 4A and 4B illustrate a structure of a hinge assembly configured to adjust resistance of a foldable housing according to an example embodiment.
Figure 4B:
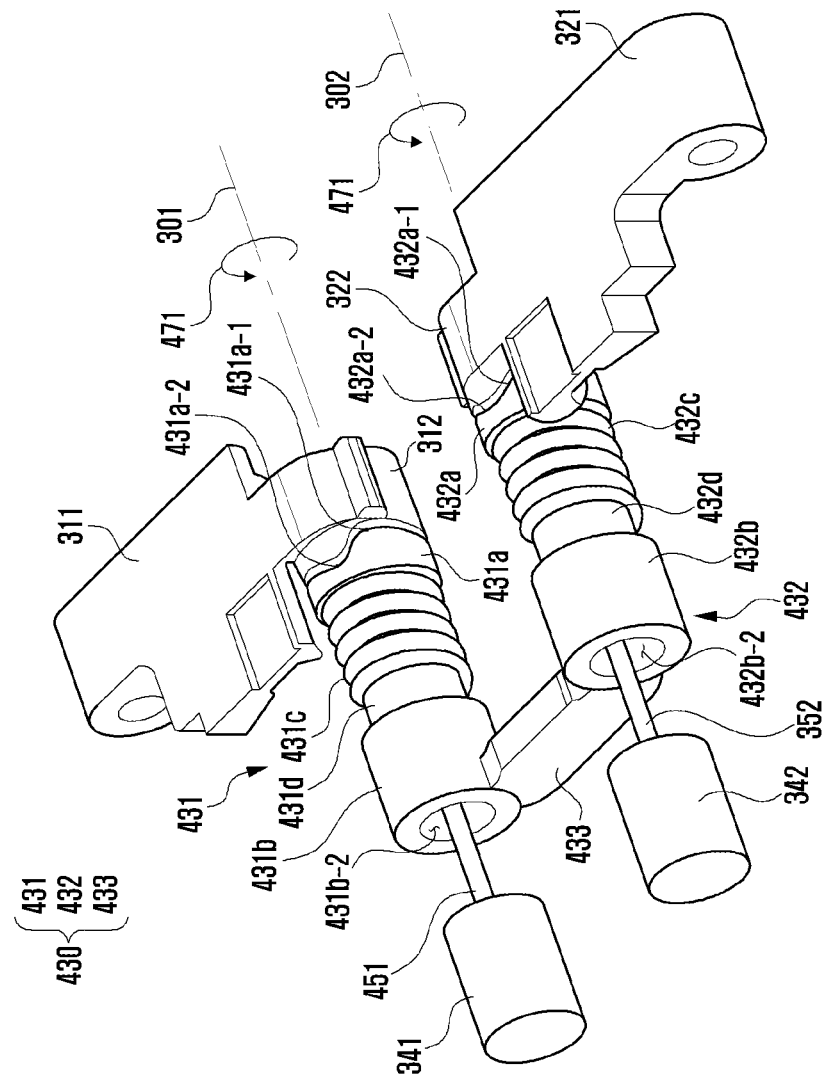

FIGS. 4A and 4B illustrate a structure of a hinge assembly 400 configured to adjust resistance of a foldable housing according to an embodiment. The hinge assembly 400 (e.g., the hinge assembly 240 in FIG. 2F) may include a first arm structure 310, a second arm structure 320, a detent structure 430, a first motor 341, and a second motor 342. The detent structure 430 may include a first detent part 431, a second detent part 432, and a connection member 433 connecting the two detent parts 431 and 432.

The first detent part 431 may be configured to come into contact with a first cam 312 along a first axis 301 and adjust the force pushing the first cam 312 by the power transferred from the first motor 341. If the force pushing the first cam 312 is reduced, resistance of the first housing 210 may be lowered, so that the user may rotate the first housing 210 more easily.

The second detent part 432 may be configured to come into contact with a second cam 322 along a second axis 302 and adjust the force pushing the second cam 322 by the power transferred from the second motor 342. If the force pushing the second cam 322 is reduced, resistance of the second housing 220 may be lowered, so that the user may rotate the second housing 220 more easily.

According to an embodiment, the first detent part 431 may include a first contact portion 431a in contact with the first cam 312, a first nut portion 431b in which the female thread is formed on the cylindrical inner wall thereof, a first bolt portion (not shown) in which the male thread is formed on the cylindrical outer wall thereof so as to be screwed to the first nut portion 431b and coupled to the first shaft 451 through a 1-1st opening 431b-2 of the first nut portion 431b, a first connection portion 431d extending from the first bolt portion and coupled to the first spring 431c through a 1-2nd opening (not shown) of the first nut portion 431b, which is formed on the opposite side of the 1-1st opening 431b-2, and a first spring 431c disposed between the first connection portion 431d and the first contact portion 431a. The first shaft 451 may rotate the first bolt portion (e.g., rotate the same in the clockwise direction 461 as shown in FIG. 4A) by the power transferred from the first motor 341 to push the first connection portion 431d toward the first cam 312, thereby increasing the tension of the first spring 431c. The first shaft 451 may reversely rotate the first bolt portion (e.g., rotate the same in the counterclockwise direction 471 as shown in FIG. 4B) by the power transferred from the first motor 341 to pull the first connection portion 431d, thereby reducing the tension of the first spring 431c.

According to an embodiment, the second detent part 432 may include a second contact portion 432a in contact with the second cam 322, a second nut portion 432b in which the female thread is formed on the cylindrical inner wall thereof, a second bolt portion (not shown) in which the male thread is formed on the cylindrical outer wall thereof so as to be screwed to the second nut portion 432b and coupled to the second shaft 452 through a 2-1st opening 432b-2 of the second nut portion 432b, a second connection portion 432d extending from the second bolt portion and coupled to the second spring 432c through a 2-2nd opening (not shown) of the second nut portion 432b, which is formed on the opposite side of the 2-1st opening 432b-2, and a second spring 432c disposed between the second connection portion 432d and the second contact portion 432a. The second shaft 452 may rotate the second bolt portion (e.g., rotate the same in the clockwise direction 461 as shown in FIG. 4A) by the power transferred from the second motor 342 to push the second connection portion 432d toward the second cam 322, thereby increasing the tension of the second spring 432c. The second shaft 452 may reversely rotate the second bolt portion (e.g., rotate the same in the counterclockwise direction 471 as shown in FIG. 4B) by the power transferred from the second motor 342 to pull the second connection portion 432d, thereby reducing the tension of the second spring 432c.

According to an embodiment, the portion of the first cam 312 facing the first contact portion 431a may be formed in a concavo-convex structure in which peaks 312a and valleys 312b are repeated. The portion of the first contact portion 431a in contact with the first cam 312 may also be formed in a concavo-convex structure in which peaks 431a-1 and valleys 431a-2 are repeated corresponding thereto.

According to an embodiment, the portion of the second cam 322 facing the second contact portion 432a may be formed in a concavo-convex structure in which peaks 322a and valleys 322b are repeated. The portion of the second contact portion 432a that comes into contact with the second cam 322 may also be formed in a concavo-convex structure in which peaks 432a-1 and valleys 432a-2 are repeated corresponding thereto.

In the above embodiment, although it has been illustrated and described that the hinge assemblies 300 and 400 have two axes, the disclosure is not limited thereto, and the hinge assemblies may have one axis or three or more axes. Even in the case where the hinge assemblies 300 and 400 have one axis or three or more axes, a motor, a detent part, and a cap corresponding to each axis may be disposed.

Figure 5:
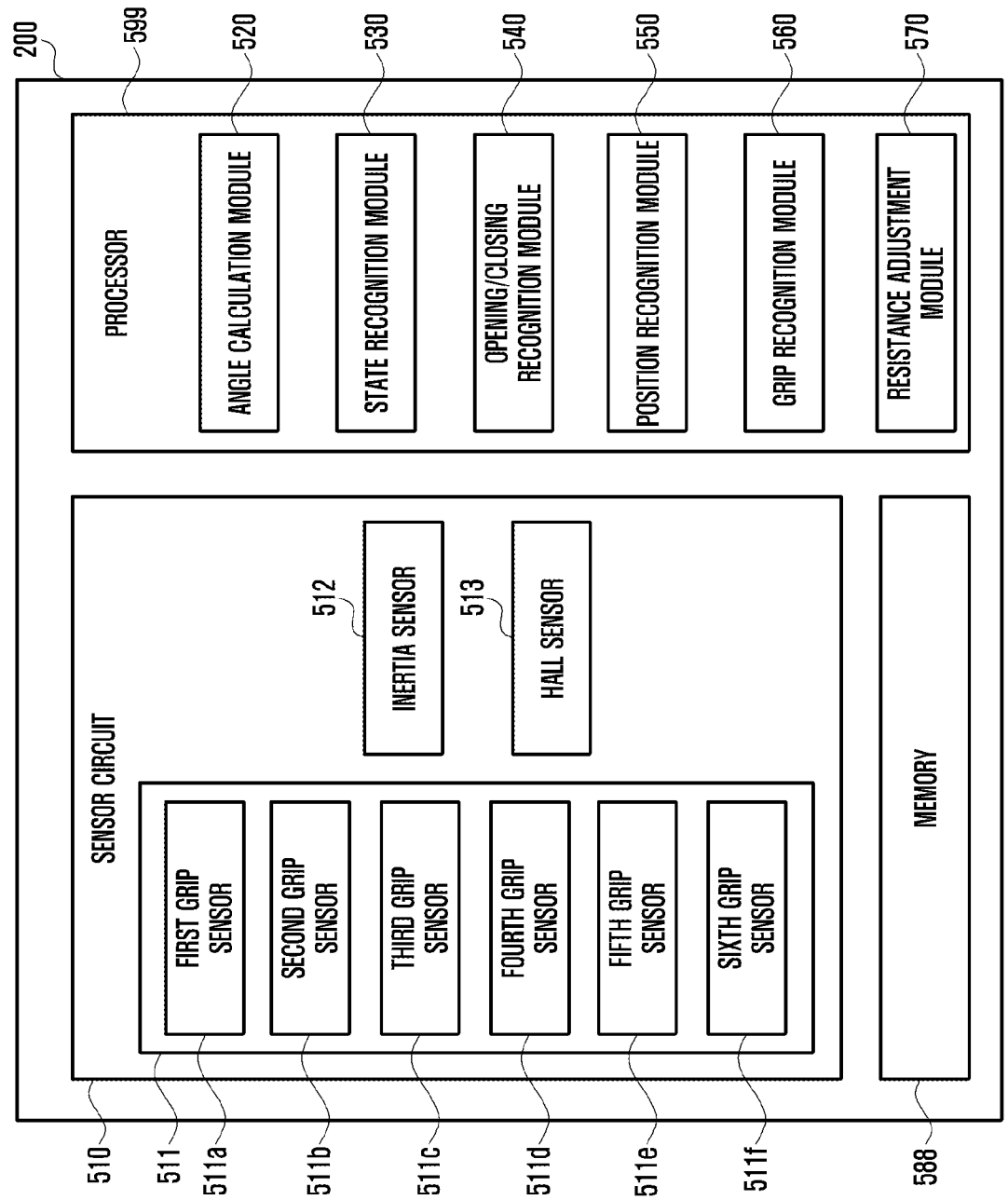
FIG. 5 is an electrical block diagram of a portable electronic device according to various example embodiments.

FIG. 5 is an electrical block diagram of a portable electronic device 200 according to various embodiments. FIGS. 6A to 6D are diagrams illustrating the cases in which a user manipulates a portable electronic device 200. The portable electronic device 200 may include a sensor circuit 510, an angle calculation module 520, a state recognition module 530, an opening/closing recognition module 540, a position recognition module 550, a grip recognition module 560, a resistance adjustment module 570, a memory 588, and a processor 599. The elements of the electronic device 200 may be operatively or electrically connected to one another.

The sensor circuit 510 (e.g., the sensor module 176 in FIG. 1) may generate data required for recognizing where and how the user is gripping the portable electronic device 200, which position (e.g., a desktop mode or a portable mode) the portable electronic device 200 is in, what the angle between the first housing 210 and the second housing 220 is, which state (e.g., a folded state, an intermediate state, or an unfolded state) the foldable housings 210 and 220 are in, or whether the foldable housings 210 and 220 are opening or closing. In an embodiment, the sensor circuit 510 may include a grip sensor 511, an inertial sensor 512, and a Hall sensor 513.

The grip sensor 511 may be electrically connected, directly or indirectly, to a conductor formed on the side surface of the portable electronic device 200. The grip sensor 511 may generate data (e.g., data indicating the amount of change in capacitance) required for recognizing that an dielectric object comes into contact with the conductor and output the same to the grip recognition module 560. The grip sensor 511 may be disposed in the inner space of the portable electronic device 200 so as to be adjacent to the conductor. According to an embodiment, referring to FIG. 2B, the grip sensors 511 may include a first grip sensor 511a disposed adjacent to the portion ⓐ made of metal, a second grip sensor 511b disposed adjacent to the portion ⓑ made of metal, a third grip sensor 511c disposed adjacent to the portion ⓓ made of metal, a fourth grip sensor 511d disposed adjacent to the portion ⓔ made of metal, a fifth grip sensor 511e disposed adjacent to the portion ⓔ made of metal, and a sixth grip sensor 511f disposed adjacent to the portion ⓕ made of metal. Each of the grip sensors may output data indicating the amount of change in capacitance to the grip recognition module 560. In another embodiment, the grip sensor 511 may be configured to have channels respectively corresponding to the metal rims, recognize the amount of change in the capacitance through each channel, and perform the operation of the grip recognition module 560, based on the recognized amount of change.

The inertial sensor 512 may generate data used to calculate directions in which forces are applied to the foldable housings 210 and 220 and/or the angle between the foldable housings 210 and 220 or to determine whether the foldable housings 210 and 220 are open or closed and output the same to at least one of the modules 520, 530, 540, and 550. According to an embodiment, the inertial sensor 512 may include a first inertial sensor (e.g., an acceleration sensor and/or a gyro sensor) that is disposed in the inner space of the first housing 210 and generates data corresponding to the position and/or motion (e.g., angular velocities and/or accelerations of 6 or 9 axes) of the first housing 210 and a second inertial sensor that is disposed in the inner space of the second housing 220 and generates data corresponding to the position and/or motion of the second housing 220.

The Hall sensor 513 may generate data used to calculate directions in which forces are applied to the foldable housings 210 and 220 and/or the angle between the foldable housings 210 and 220 or to determine whether the foldable housings 210 and 220 are open or closed and output the same to at least one of the modules 520, 530, 540, and 550.

The Hall sensor 513 may be attached to the hinge assembly 240 or disposed in the inner space of the first housing 210 or the second housing 210. For example, the Hall sensor 513 may measure the strength of magnetic field and generate data corresponding to the measured magnetic field strength.

The angle calculation module 520 may calculate the angle between the first housing 210 and the second housing 220, based on data received from the sensor circuit 510 (e.g., the inertial sensor 512 and/or the Hall sensor 513). For example, the angle calculation module 520 may receive data indicating the motion of the first housing 210 from the first inertial sensor and receive data indicating the motion of the second housing 220 from the second inertial sensor. The angle calculation module 520 may calculate an angle using data received from the two inertial sensors. The angle calculation module 520 may receive data corresponding to the strength of magnetic field from the Hall sensor 513 and calculate an angle using received data. The angle calculation module 520 may calculate the angle more precisely using a combination of two pieces of data.

Figure 6A:
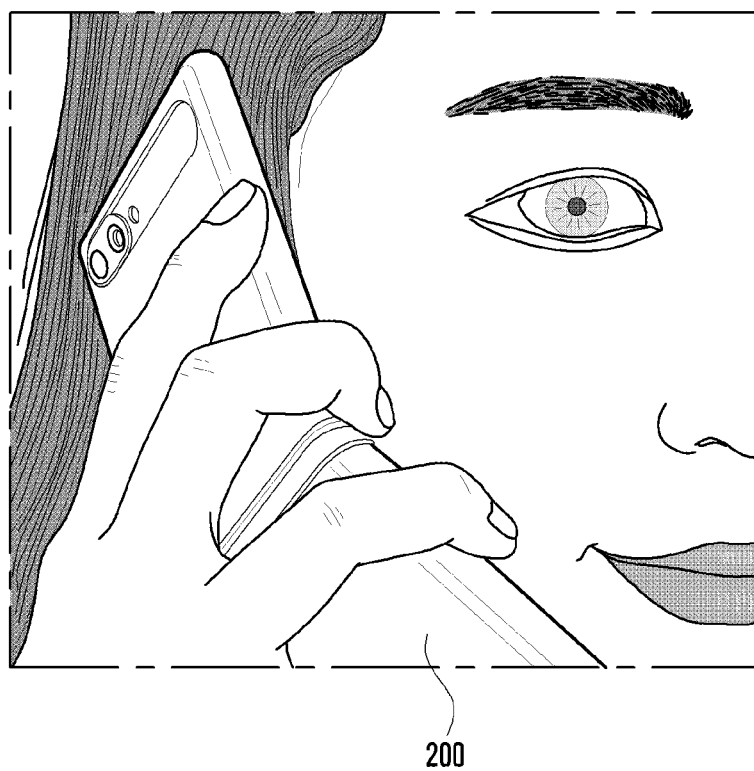
FIGS. 6A to 6D are example diagrams illustrating the cases in which a user manipulates a portable electronic device.
Figure 6B:
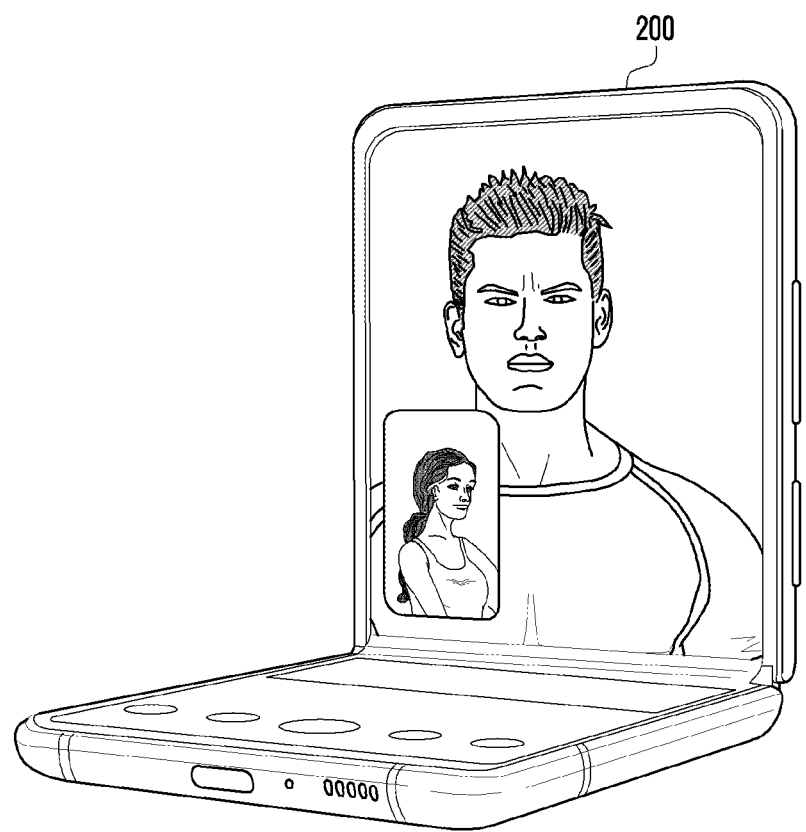

The state recognition module 530 may recognize the state of the portable electronic device 200 as, for example, an unfolded state, a folded state, or an intermediate state, based on the calculated angle. For example, if the calculated angle is between about 0 degrees and 10 degrees, the state recognition module 530 may determine that the portable electronic device 200 is in the folded state. If the calculated angle is about 180 degrees, the state recognition module 530 may determine that the portable electronic device 200 is in the unfolded state. If the angle is between about 10 degrees and 179 degrees, the state recognition module 530 may determine that the portable electronic device 200 is in the intermediate state. The state recognition module 530 may subdivide the intermediate state according to angle ranges. For example, referring to FIG. 6A, a proximity call in which the portable electronic device 200 is held against the ear for a call may be suitable when the angle is about 150 degrees to 170 degrees. Accordingly, if the angle is about 150 degrees to 170 degrees, the state of the portable electronic device 200 may be a first intermediate state for the proximity call in the portable mode. Referring to FIG. 6B, a video call in which the portable electronic device 200 is mounted on the desk or the like may be suitable when the angle is about 90 degrees to 100 degrees. Accordingly, if the angle is about 90 degrees to 100 degrees, the state of the portable electronic device 200 may be a second intermediate state for the video call in the desktop mode.

The opening/closing recognition module 540, which may comprise circuitry, may recognize the opening/closing state of the foldable housings 210 and 220, based on data received from the sensor circuit 510 (e.g., the inertial sensor 512 and/or the Hall sensor 513).

According to an embodiment, the opening/closing recognition module 540 may detect a change in the magnetic field strength, based on data received from the Hall sensor 513. For example, the opening/closing recognition module 540 may recognize that the foldable housings 210 and 220 are opening if the strength is being reduced and recognize that the foldable housings 210 and 220 are closing if the strength is being increased. If there is no change in the strength, the opening/closing recognition module 540 may recognize that the foldable housings 210 and 220 stopped rotating and are in a stationary state.

According to an embodiment, the opening/closing recognition module 540 may calculate the directions of forces applied to the first housing 210 and the second housing 220 using data received from the inertial sensor 512. If the force acts in the direction in which the first housing 210 (e.g., the first side surface 213a in FIG. 2A) and the second housing 220 (e.g., the fourth side surface 223a in FIG. 2A) move closer to each other, the opening/closing recognition module 540 may recognize the current opening/closing state as a closing state. If the force acts in the direction in which the first housing 210 and the second housing 220 move away from each other, the opening/closing recognition module 540 may recognize the current opening/closing state as an opening state.

According to an embodiment, the opening/closing recognition module 540 may recognize the opening/closing state of the foldable housings 210 and 220, based on an angle calculated by the angle calculation module 520. For example, if the angle is being reduced, the opening/closing recognition module 540 may recognize the current opening/closing state as a closing state. If the angle is being increased, the opening/closing recognition module 540 may recognize the current opening/closing state as an opening state. If there is no change in the angle, the opening/closing recognition module 540 may recognize that the foldable housings 210 and 220 stopped rotating and are in a stationary state.

According to an embodiment, the opening/closing recognition module 540 may recognize the current opening/closing state of the foldable housings 210 and 220, based on a combination of the magnetic field strength, the angle, and the force directions.

As an example, if the force acts in a direction in which the first housing 210 and the second housing 220 move away from each other, if the angle is greater than or equal to a designated first threshold angle, and if the magnetic field strength is less than a designated first threshold value, the opening/closing recognition module 540 may recognize that the foldable housings 210 and 220 are opening. The first threshold angle and the first threshold value may be values corresponding to the folded state of the foldable housings 210 and 220. For example, the first threshold angle may be designated as about 10 degrees, and the first threshold value may be designated as the maximum or high strength value. If the force acts in a direction in which the first housing 210 and the second housing 220 move closer to each other, if the angle is less than a second threshold angle, which is greater than the first threshold angle, and if the magnetic field strength is more than or equal to a second threshold value that is less than the first threshold value, the opening/closing recognition module 540 may recognize that the foldable housings 210 and 220 are closing. The second threshold angle and the second threshold value may be values corresponding to the unfolded state of the foldable housings 210 and 220. For example, the second threshold angle may be designated as about 179 degrees, and the second threshold value may be designated as the minimum or low strength value.

As another example, if the angle falls within a designated first angle range (e.g., about 0 degrees to 20 degrees), if the force acts in a direction in which the first housing 210 and the second housing 220 move away from each other, and if the magnetic field strength falls within a designated first strength range (e.g., a range including the maximum or high strength value), the opening/closing recognition module 540 may recognize the current opening/closing state as an opening state (e.g., the state of switching from the folded state to the intermediate state). If the angle falls within a designated second angle range (e.g., about 160 degrees to 180 degrees), if the force acts in a direction in which the first housing 210 and the second housing 220 move closer to each other, and if the magnetic field strength falls within a designated second strength range (e.g., a range including the minimum or low strength value), the opening/closing recognition module 540 may recognize the current opening/closing state as a closing state (e.g., the state of switching from the unfolded state to the intermediate state).

The position recognition module 550, which may comprise circuitry, may recognize the position of the portable electronic device 200 as a desktop mode or a portable mode, based on data received from the sensor circuit 510 (e.g., the inertial sensor 512). For example, the position recognition module 550 may calculate the acceleration of the portable electronic device 200 using data received from the inertial sensor 512. If the calculated acceleration value exceeds a designated reference value, the position recognition module 550 may determine the position of the portable electronic device 200 as a portable mode in which the user is carrying the portable electronic device 200. If the acceleration value is less than the reference value, the position recognition module 550 may determine the position of the portable electronic device 200 as a desktop mode in which the user places the same on the table or the like.

The grip recognition module 560, which may comprise circuitry, may recognize the location with which the user's hand comes into contact in the portable electronic device 200, based on data received from the grip sensor 511. The grip recognition module 560 may recognize the gripping state, based on the recognized location information. According to an embodiment, the grip recognition module 560 may measure the capacitance formed between the portion ⓐ and the ground through the first grip sensor 511*a* and determine whether or not the user's hand is in contact with the portion ⓐ, based on the amount of change in the capacitance. The grip recognition module 560 may determine whether or not the user's hand is in contact with other metal portions ⓑ, ⓒ, ⓓ, ⓔ, and ⓕ in the same manner The grip recognition module 560 may determine the current gripping state as the state in which the user is gripping the portable electronic device 200 with one hand or both hands, based on whether or not the user's hand is in contact with each portion.

Figure 6C:
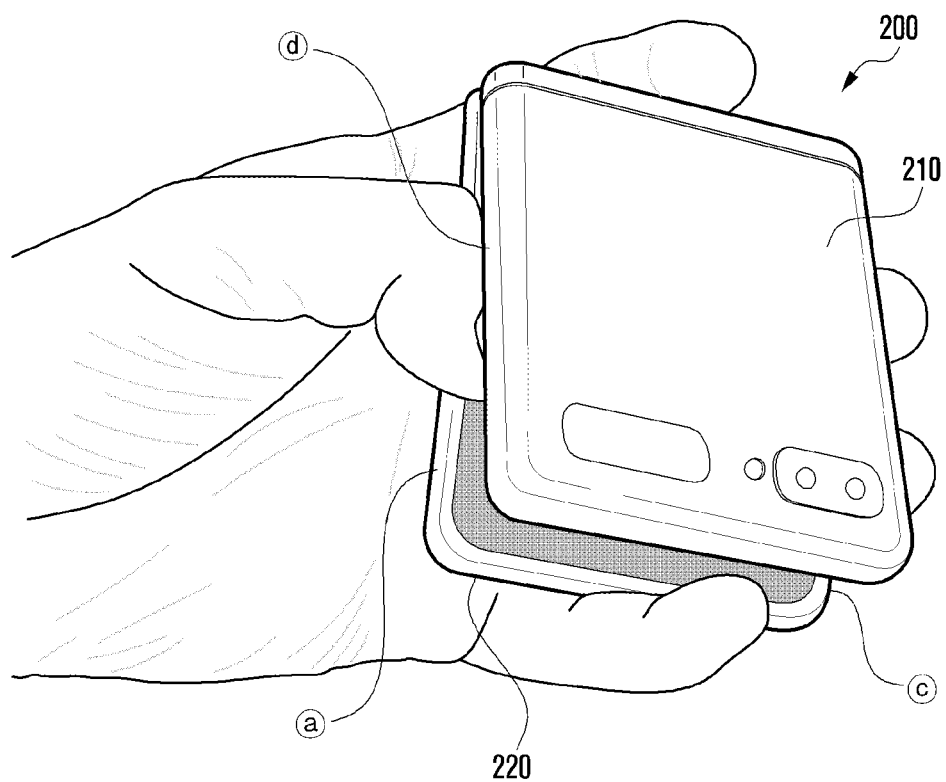
Figure 6D:
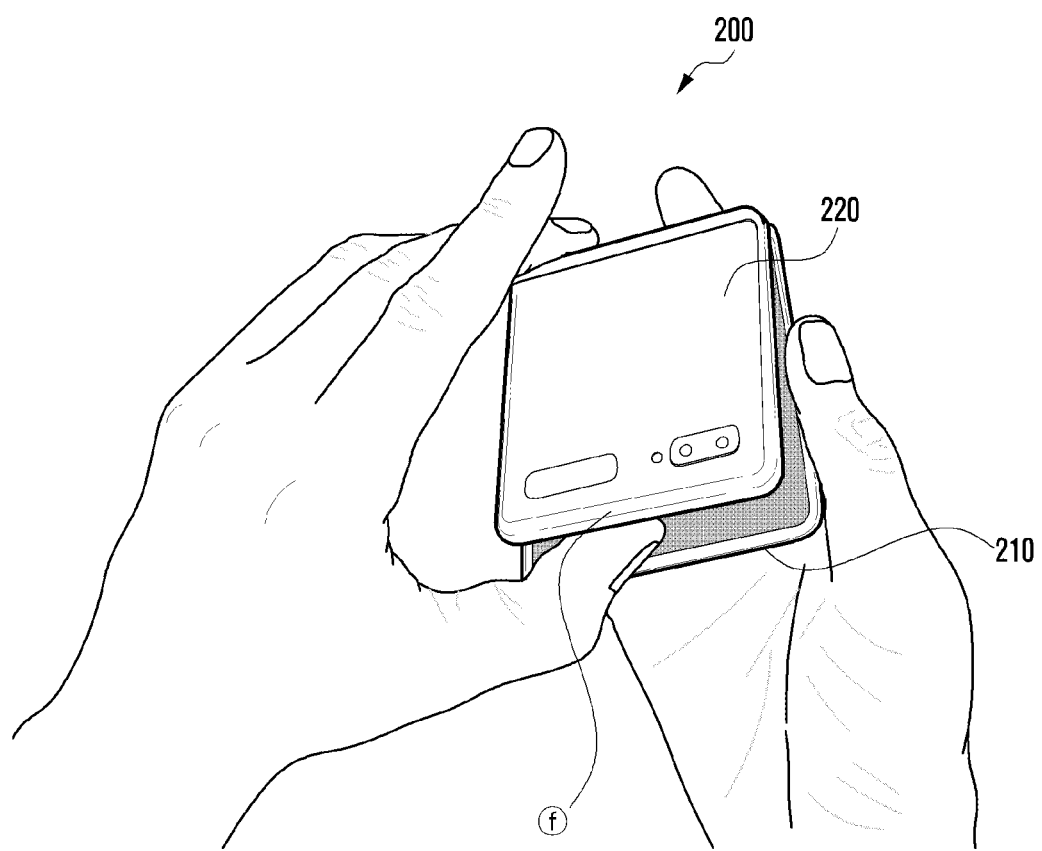

According to an embodiment, the grip recognition module 560 may recognize the gripping state, based on the recognized location information, while the foldable housings 210 and 220 are opening in the portable mode. Referring to FIG. 6C, when the user grips the portable electronic device 200 by the left hand and tries to open the first housing 210 with the left thumb, ⓐ and ⓒ may come into contact with the left hand to support the second housing 220, and ⓓ may not come into contact in the first housing 210. Although not shown, the first housing 210 may be opened with a finger other than the thumb according to the user. For example, when the user grips the portable electronic device 200 with the left hand and tries to open the first housing 210 with the middle or index finger of the left hand, ⓐ and ⓒ may come into contact with the left hand, and ⓔ may not come into contact. When the user grips the portable electronic device 200 with the right hand and tries to open the first housing 210 with the right thumb, ⓐ and ⓒ may come into contact with the right hand in the second housing 220, and ⓔ may not come into contact in the first housing 210. When the user grips the portable electronic device 200 with the right hand and tries to open the first housing 210 with the middle or index finger of the right hand, ⓐ and ⓒ may come into contact with the right hand, and ⓓ may not come into contact. Referring to FIG. 6D, when the user supports the second housing 220 with one hand and tries to open the first housing 210 with the other hand, ⓐ and ⓒ of the second housing 220 may come into contact with one hand, and CD of the first housing 210 may come into contact with the other hand. Referring to Table 1 below, the grip recognition module 560 may determine the state in which contact portions are ⓐ and ⓒ and in which non-contact portion is ⓓ or ⓔ as the opening state by one hand. The grip recognition module 560 may determine the state in which contact portions are ⓐ, ⓒ, and ⓕ as an opening state by both hands.

According to an embodiment, the grip recognition module 560 may recognize the gripping state, based on the recognized location information, while the foldable housings 210 and 220 are closing in the portable mode. When the user grips the portable electronic device 200 with one hand (the left or right hand) and pushes the rear surface of the first housing 210 with the index or middle finger of the same hand to close the first housing 210, ⓐ and ⓒ may come into contact with the user's hand to support the second housing 220, and ⓓ, ⓔ, and ⓕ of the first housing 210 may not come into contact. When trying to close the first housing 210 with the left hand, both ⓒ of the second housing 220 and ⓓ of the first housing 210 may come into contact. Alternatively, when trying to close the first housing 210 with the right hand, both ⓐ of the second housing 220 and ⓔ of the first housing 210 may come into contact. Referring to Table 1 below, the grip recognition module 560 may determine the state in which contact portions are ⓐ and ⓒ and in which non-contact portions are ⓓ, ⓔ, and ⓕ as a closing state by one hand. The grip recognition module 560 may determine the state in which the contact portions are ⓒ and ⓓ or ⓐ and ⓔ as a closing state by one hand.

According to an embodiment, the grip recognition module 560 may recognize the gripping state, based on the recognized location information, while the foldable housings 210 and 220 are closing in the desktop mode. When the user tries to close the first housing 210 by pressing down the first housing 210 with a finger while the second housing 220 is placed on a table, ⓓ, ⓔ, or ⓕ of the first housing 210 may come into contact with the user's finger. Alternatively, when the user tries to close the first housing 210 by gripping the second housing 220 with one hand and pressing down the first housing 210 with a finger of the other hand, ⓑ of the second housing 220 may come into contact, and ⓓ, ⓔ, or ⓕ of the first housing 210 may come into contact. Referring to Table 1 below, the grip recognition module 560 may determine the state in which a contact portion is one of ⓓ, ⓔ, and ⓕ as a closing state by one hand. The grip recognition module 560 may determine the state in which ⓑ is in contact and in which one of ⓓ, ⓔ, and ⓕ is in contact as a closing state by both hands.

TABLE 1

| Position | Opening/closing state | Contact portions | Non-contact portions |
|---|---|---|---|
| Portable mode | Opening state by one hand | ⓐ ⓒ<br>ⓐ ⓒ | ⓓ<br>ⓔ |
| | Opening state by both hands | ⓐ ⓒ ⓕ | |
| | Closing state by one hand | ⓐ ⓒ<br>ⓒ ⓓ<br>ⓐ ⓔ | ⓓ ⓔ ⓕ |
| Desk mode | Closing state by one hand | One of<br>ⓓ ⓔ ⓕ | |
| | Closing state by both hands | One of ⓑ +<br>ⓓ ⓔ ⓕ | |

The resistance adjustment module 570, which may comprise circuitry, may control the first motor 341 and/or the second motor 342 to change the structure of the detent structure 330 or 430, thereby adjusting rotational resistance of the foldable housings 210 and 220. For example, the resistance adjustment module 570 may control the motor (the first motor 341 and/or the second motor 342) to change the structure of the detent structure 330 or 430, thereby switching the resistance state of the foldable housings 210 and 220 from a first resistance state to a second resistance state in which the rotational resistance is less than that in the first resistance state. The resistance adjustment module 570 may control the motor to restore the structure of the detent structure 330 or 430, thereby switching the resistance state of the foldable housings 210 and 220 from the second resistance state to the first resistance state. In the detent structure 330 in FIG. 3, the first resistance state may include the state in which the first contact portion 331a is in contact with the first cam 312 and/or the state in which the second contact portion 332a is in contact with the second cam 322. The second resistance state may include the state in which the first contact portion 331a is separated from the first cam 312 and/or the state in which the second contact portion 332a is separated from the second cam 322. In the detent structure 430 in FIG. 4, the first resistance state may include the state in which the first contact portion 431a is in contact with the first cam 312 by the tension of the first spring 431c and/or the state in which the second contact portion 432a is in contact with the second cam 322 by the tension of the second spring 432c. The second resistance state may include the state in which the first contact portion 431a is in contact with the first cam 312 by a pushing force of the first spring 431c in which the tension is less than that in the first resistance state and/or the state in which the second contact portion 432a is in contact with the second cam 322 by a pushing force of the second spring 432c in which the tension is less than that in the first resistance state.

According to an embodiment, the resistance adjustment module 570, in response to recognizing an opening or closing state by one hand in the portable mode by the recognition modules 540, 550, and 560, may control the motors 341 and 342 to change the structure of the detent structure 330 or 430, thereby switching the foldable housings 210 and 220 from the first resistance state to the second resistance state. Accordingly, the user may easily open or close the foldable housings 210 and 220 with one hand.

According to an embodiment, in response to recognizing the opening or closing state in the portable mode by the recognition modules 540 and 550, regardless of whether or not it is gripped by one hand, the resistance adjustment module 570 may control the motors 341 and 342 to change the structure of the detent structure 330 or 430, thereby switching the foldable housings 210 and 220 from the first resistance state to the second resistance state.

According to an embodiment, the resistance adjustment module 570 may recognize occurrence of a voice call-related event and, in response thereto, control the motors 341 and 342 to change the structure of the detent structure 330 or 430, thereby changing the foldable housings 210 and 220 from the first resistance state to the second resistance state. For example, the voice call-related event may include a notification of a voice call request message received from an external device to the portable electronic device 200 through a wireless communication circuit (e.g., the wireless communication module 192 in FIG. 1 which may comprise communication circuitry). Accordingly, in the case of an incoming call, the resistance state of the foldable housings 210 and 220 may switch to the state in which the user is able to easily open the same.

According to an embodiment, the resistance adjustment module 570 may recognize reception of the voice call request message through the wireless communication circuit and, in response to recognizing the position of the portable electronic device 200 as a portable mode by the position recognition module 550, control the motors 341 and 342 to change the structure of the detent structure 330 or 430, thereby switching the foldable housings 210 and 220 from the first resistance state to the second resistance state.

According to an embodiment, in response to recognizing reception of a video call request message through the wireless communication circuit, the resistance adjustment module 570 may control the motors 341 and 342 to change the structure of the detent structure 330 or 430, thereby switching the foldable housings 210 and 220 from the first resistance state to the second resistance state.

According to an embodiment, the resistance adjustment module 570 may recognize the reception of the video call request message through the wireless communication circuit and, in response to recognizing the position of the portable electronic device 200 as a desktop mode by the position recognition module 550, control the motors 341 and 342 to change the structure of the detent structure 330 or 430, thereby switching the foldable housings 210 and 220 from the first resistance state to the second resistance state.

According to an embodiment, if the opening/closing recognition module 540 recognizes that the foldable housings 210 and 220 stopped rotating and are in a stationary state, the resistance adjustment module 570 may control the motors 341 and 342 to restore the structure of the detent structure 330 or 430, thereby switching the foldable housings 210 and 220 from the second resistance state to the first resistance state.

According to an embodiment, if the state recognition module 530 recognizes that the foldable housings 210 and 220 switches from the intermediate state to the folded state or from the intermediate state to the unfolded state, the resistance adjustment module 570 may control the motors 341 and 342 to restore the structure of the detent structure 330 or 430, thereby switching the foldable housings 210 and 220 from the second resistance state to the first resistance state.

According to an embodiment, if an angle calculated by the angle calculation module 520 falls within a designated first angle range (e.g., 0 degrees to 10 degrees) or second angle range (e.g., 170 degrees to 180 degrees), the resistance adjustment module 570 may control the motors 341 and 342 to restore the structure of the detent structure 330 or 430, thereby switching the foldable housings 210 and 220 from the second resistance state to the first resistance state.

According to an embodiment, if the state recognition module 530 recognizes that the foldable housings 210 and 220 are in a first intermediate state while the foldable housings 210 and 220 are configured as the second resistance state according to the reception of the voice call request message from an external device, the resistance adjustment module 570 may control the motors 341 and 342 to restore the structure of the detent structure 330 or 430, thereby switching the foldable housings 210 and 220 from the second resistance state to the first resistance state. Accordingly, the rotational resistance of the foldable housings 210 and 220 may be strengthened in the first intermediate state as shown in FIG. 6A, so that the user may stably perform the proximity call.

According to an embodiment, if the position recognition module 550 recognizes that the portable electronic device 200 is in the desktop mode and if the state recognition module 530 recognizes that the foldable housings 210 and 220 are in the second intermediate state while the foldable housings 210 and 220 are configured as the second resistance state according to reception of a video call request message from an external device, the resistance adjustment module 570 may control the motors 341 and 342 to restore the structure of the detent structure 330 or 430, thereby switching the foldable housings 210 and 220 from the second resistance state to the first resistance state. Accordingly, the rotational resistance of the foldable housings 210 and 220 may be increased in the second intermediate state as shown in FIG. 6B, so that the user may stably perform a video call while placing the portable electronic device 200 on a table or the like.

According to an embodiment, when the user tries to open or close the foldable housings 210 and 220, one of the first housing 210 and the second housing 220 may rotate and the other may be relatively fixed as a support of the rotation. That is, the object to which the user applies force (e.g., the object pushed up with the thumb as shown in FIG. 6C or 6D) may be only one of the first housing 210 and the second housing 220. The resistance adjustment module 570, in response to recognizing by the recognition modules 540, 550, and 560 that the first housing 210 is opening or closing by one hand, may control the first motor 341 to change the structure of the first detent part 331 or 431, thereby switching the first housing 210 from the first resistance state to the second resistance state. The resistance adjustment module 570, in response to recognizing by the recognition modules 540, 550, and 560 that the second housing 220 is opening or closing by one hand, may control the second motor 342 to change the structure of the second detent part 332 or 432, thereby switching the second housing 220 from the first resistance state to the second resistance state.

At least one of the modules 520, 530, 540, 550, 560, and 570 may be stored as instructions in the memory 588 (e.g., the memory 130 in FIG. 1) and executed by a processor 599 (e.g., the processor 120 in FIG. 1). At least one of the modules 520, 530, 540, 550, 560, and 570 may be executed by a processor (e.g., an auxiliary processor 123) specialized in the process of adjusting the resistance of the foldable housings 210 and 220. Each module herein may comprise circuitry, such as processing circuitry.

Figure 7:
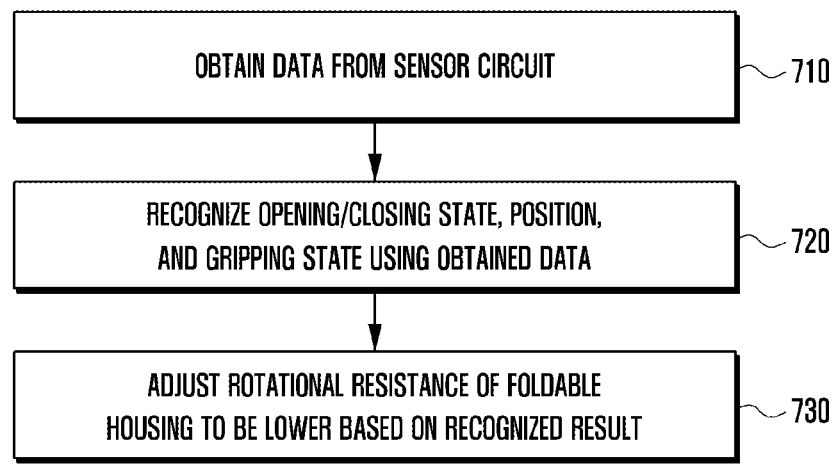
FIG. 7 illustrates operations performed by a processor in a portable electronic device according to an example embodiment.

FIG. 7 illustrates operations performed by a processor 599 in a portable electronic device 200 according to an embodiment.

In operation 710, the processor 599 may obtain data required for recognizing the opening/closing state, position, and gripping state of the portable electronic device 200 from the sensor circuit 510.

In operation 720, the processor 599, using the obtained data, may recognize what the opening/closing state of the foldable housings 210 and 220 is, what position the portable electronic device 200 is in, and where and how the user is gripping the portable electronic device 200. For example, the processor 599 may execute the opening/closing recognition module 540 to recognize whether the foldable housings 210 and 220 are in the opening state, closing state, or stationary state. The processor 599 may execute the position recognition module 550, thereby recognizing whether the current position of the portable electronic device 200 is the desktop mode or portable mode. In the portable mode, the processor 599 may execute the grip recognition module 560 to determine whether or not the user is gripping the portable electronic device 200 and, if so, recognize whether the gripping state is a one-handed gripping or both-handed gripping.

In operation 730, the processor 599 may adjust the rotational resistance of the foldable housings 210 and 220 to be lower, based on the recognized result.

According to an embodiment in operation 730, in response to the fact that information indicating the opening/closing state (opening state or closing state) is included in the recognized result, the processor 599 may control the motors 341 and 342, thereby switching the foldable housings 210 and 220 from the first resistance state to the second resistance state in which the rotational resistance is less than that in the first resistance state.

According to an embodiment in operation 730, in response to the fact that information indicating the opening/closing state (opening state or closing state) and the portable mode is included in the recognized result, the processor 599 may control the motors 341 and 342, thereby switching the foldable housings 210 and 220 from the first resistance state to the second resistance state.

According to an embodiment in operation 730, in response to the fact that information indicating the opening/closing state (opening state or closing state), the portable mode, and the one-handed gripping state is included in the recognized result, the processor 599 may control the motors 341 and 342, thereby switching the foldable housings 210 and 220 from the first resistance state to the second resistance state.

Figure 8:
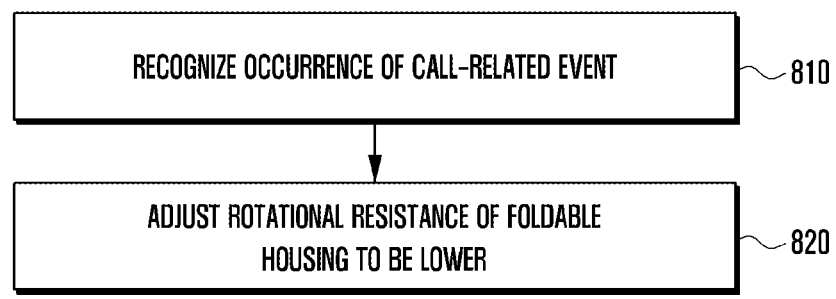
FIG. 8 illustrates operations performed by a processor in a portable electronic device according to an example embodiment.

FIG. 8 illustrates operations performed by a processor 599 in a portable electronic device 200 according to an embodiment.

In operation 810, the processor 599 may recognize that a call-related event occurs. For example, the processor 599 may receive a voice or video call request message from an external device through a wireless communication circuit.

In operation 820, the processor 599, based at least on the occurrence of the call-related event, may control the motors 341 and 342 to adjust the rotational resistance of the foldable housings 210 and 220 to be lower.

According to an embodiment in operation 820, if the reception of the voice or video call request message is recognized, the processor 599 may switch the foldable housings 210 and 220 from the first resistance state to the second resistance state.

According to an embodiment in operation 820, if the processor 599 recognizes the reception of the voice call request message and recognizes the position of the portable electronic device 200 as a portable mode, based on data received from the inertial sensor 512, the processor 599 may switch the foldable housings 210 and 220 from the first resistance state to the second resistance state.

According to an embodiment in operation 820, if the processor 599 recognizes the reception of the video call request message and recognizes the position of the portable electronic device 200 as a desktop mode, based on data received from the inertial sensor 512, the processor 599 may switch the foldable housings 210 and 220 from the first resistance state to the second resistance state.

Figure 9:
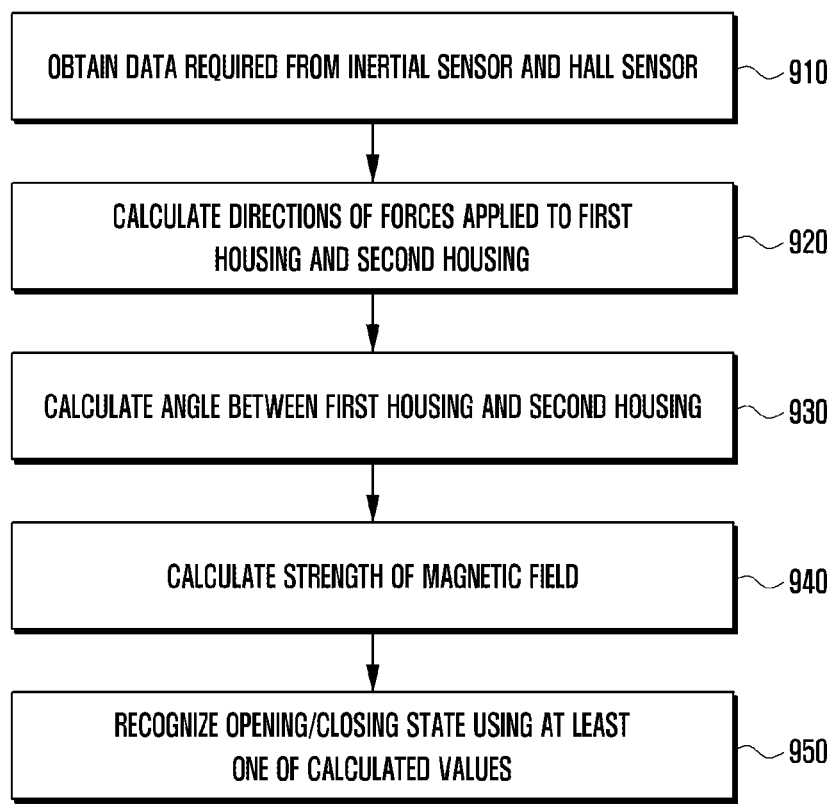
FIG. 9 illustrates operations performed by a processor in a portable electronic device according to an example embodiment.

FIG. 9 illustrates operations performed by a processor 599 in a portable electronic device 200 according to an embodiment.

In operation 910, the processor 599 may obtain data required for recognizing the opening/closing state from the inertial sensor 512 and the Hall sensor 513.

In operation 920, the processor 599 may calculate directions of forces applied to the first housing 210 and the second housing 220 using the data received from the inertial sensor 512. In the case where the foldable housings 210 and 220 are opening or closing, the direction of a force applied to the first housing 210 and the direction of a force applied to the second housing 220 may be opposite to each other. That is, when the foldable housings 210 and 220 are opening, the forces may act in directions in which the first housing 210 and the second housing 220 move closer to each other. When the foldable housings 210 and 220 are closing, the forces may act in directions in which the first housing 210 and the second housing 220 move away from each other. In an embodiment, the processor 599 may recognize that the force applied to the first housing 210 and the force applied to the second housing 220 act in the opposite directions to each other by executing the opening/closing recognition module 540.

In operation 930, the processor 599 may calculate an angle between the first housing 210 and the second housing 220 using data received from the inertial sensor 512 and/or the Hall sensor 513. In an embodiment, the processor 599 may calculate an angle of the foldable housings 210 and 220 by executing the angle calculation module 520.

In operation 940, the processor 599 may calculate the strength of magnetic field using data received from the Hall sensor 513.

In operation 950, the processor 599 may recognize the opening/closing state using at least one of the calculated values.

According to an embodiment in operation 950, if the forces act in the opposite directions, if the angle is greater than or equal to a designated first threshold angle (e.g., about 10 degrees), and if the strength of magnetic field is less than a designated first threshold value, the processor 599 may recognize that the current opening/closing state of the foldable housings 210 and 220 corresponds to an opening state. If the forces act in the opposite directions, if the angle is less than a second threshold angle that is greater than the first threshold angle, and if the strength of magnetic field is greater than or equal to a second threshold value that is less than the first threshold value, the processor 599 may recognize that the current opening/closing state corresponds to a closing state.

According to an embodiment in operation 950, if the forces act in the opposite directions, if the angle falls within a designated first angle range (e.g., about 0 degrees to 20 degrees), and if the strength of magnetic field is less than or equal to a designated first strength value (e.g., a maximum or high value), the processor 599 may recognize that the current opening/closing state corresponds to an opening state (e.g., the state of switching from the folded state to the intermediate state). If the forces act in the opposite directions, if the angle falls within a designated second angle range (e.g., about 160 degrees to 180 degrees), and if the strength of magnetic field is greater than or equal to a second strength value (e.g., a minimum or low value), the processor 599 may recognize that the current opening/closing state corresponds to a closing state (e.g., the state of switching from the unfolded state to the intermediate state).

According to an embodiment in operation 950, the processor 599 may recognize that the current opening/closing state is the closing state if the strength of magnetic field is being increased and that the current opening/closing state is the opening state if the strength is being reduced. Operations 920 and 930 may be omitted from this embodiment.

According to an embodiment in operation 950, the processor 599 may recognize that the current opening/closing state is the closing state if the forces act in directions in which the first housing 210 and the second housing 220 move closer to each other and recognize that the current opening/closing state is the opening state if the forces act in directions in which the first housing 210 and the second housing 220 move away from each other. Operations 930 and 940 may be omitted from this embodiment.

According to an embodiment in operation 950, the processor 599 may recognize that the current opening/closing state is the closing state if the angle between the first housing 210 and the second housing 220 is being reduced and recognize that the current opening/closing state is the opening state if the angle is being increased. Operations 920 and 940 may be omitted from this embodiment.

Figure 10:
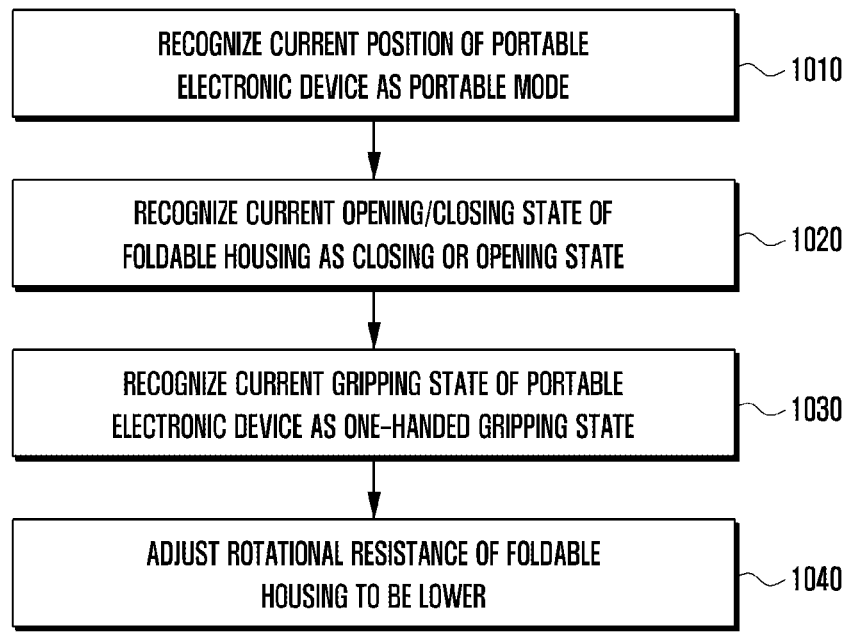
FIG. 10 illustrates operations performed by a processor in a portable electronic device according to an example embodiment.

FIG. 10 illustrates operations performed by a processor 599 in a portable electronic device 200 according to an embodiment.

In operation 1010, the processor 599 may recognize that the current position of the portable electronic device 200 is a portable mode, based on data (e.g., data indicating acceleration) received from the inertial sensor 512. Operation 1020 may be performed according to the recognition of the portable mode.

In operation 1020, the processor 599 may recognize that the current opening/closing state of the foldable housings 210 and 220 is a closing state or an opening state, based on data received from the inertial sensor 512 and/or the Hall sensor 513. Operation 1020 may be the same as operation 950. Operation 1030 may be performed according to the recognition of the closing or opening state.

In operation 1030, the processor 599 may recognize that the current gripping state is a one-handed gripping state in which the user is gripping the portable electronic device 200 with one hand, based on data received from the grip sensor 511. Operation 1040 may be performed according to the recognition of the one-hand gripping state.

During the opening or closing state by one hand in the portable mode as recognized above, the processor 599 may configure the rotational resistance of the foldable housings 210 and 220 to be lower in operation 1040. According to an embodiment, the processor 599 may control the motors 341 and 342, thereby switching the foldable housings 210 and 220 from the first resistance state to the second resistance state in which the rotational resistance is lower than that in the first resistance state.

Figure 11:
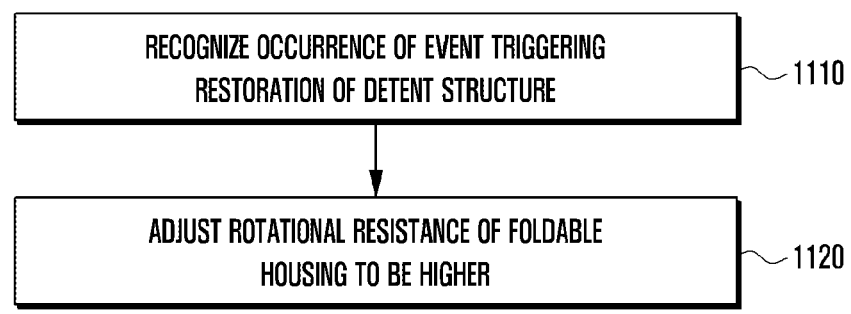
FIG. 11 illustrates operations performed by a processor in a portable electronic device according to an example embodiment.

FIG. 11 illustrates operations performed by a processor 599 in a portable electronic device 200 according to an embodiment. The following operations may be performed when the resistance of the foldable housings 210 and 220 is configured to be lower (e.g., the second resistance state).

In operation 1110, the processor 599 may recognize occurrence of an event triggering restoration of a detent structure.

In operation 1120, the processor 599, in response to the occurrence of the event, may restore the detent structure, thereby adjusting the rotational resistance of the foldable housings 210 and 220 to be higher.

According to an embodiment in operation 1120, if the processor 599 recognizes that the foldable housings 210 and 220 stopped rotating and are in the stationary state, based on data received from the inertial sensor 512 and/or the Hall sensor 513, the processor 599 may control the motors 341 and 342 to restore the structure of the detent structure 330 or 430.

According to an embodiment in operation 1120, if the angle, calculated using data received from the inertial sensor 512 and/or the Hall sensor 513, falls within a designated first angle range (e.g., 0 degrees to 10 degrees) or second angle range (e.g., 170 degrees to 180 degrees), the processor 599 may control the motors 341 and 342 to restore the structure of the detent structure 330 or 430.

According to an embodiment in operation 1120, if the foldable housings 210 and 220 are recognized to belong to a first angle range (e.g., about 150 degrees to 170 degrees) while the foldable housings 210 and 220 are configured to have a low resistance according to the reception of a voice call request message from an external device, the processor 599 may control the motors 341 and 342 to restore the structure of the detent structure 330 or 430.

According to an embodiment in operation 1120, if the portable electronic device 200 is recognized to be in a desktop mode and if the foldable housings 210 and 220 are recognized to belong to a second angle range (e.g., about 90 degrees to 100 degrees) while the foldable housings 210 and 220 are configured to have a low resistance according to the reception of a video call request message from an external device, the processor 599 may control the motors 341 and 342 to restore the structure of the detent structure 330 or 430.

In various embodiments, a portable electronic device may include a foldable housing including a first housing (e.g., the first housing 210 in FIG. 2) and a second housing (e.g., the second housing 220 in FIG. 2), a hinge assembly (e.g., the hinge assembly 240 in FIG. 2) configured to connect the first housing and the second housing to be rotatable, a sensor circuit (e.g., the sensor circuit 510 in FIG. 5), and a processor (e.g., the processor 599 in FIG. 5) connected, directly or indirectly, to the sensor circuit. The hinge assembly may include at least one motor and a detent structure configured to cause the foldable housing to switch from a first resistance state to a second resistance state in which resistance to the rotation is lower than that in the first resistance state using power transferred from the at least one motor. The processor may be configured to recognize that the foldable housing is opening or closing, based on data received from the sensor circuit, and, based at least on recognizing that the foldable housing is opening or closing, control the at least one motor to switch the foldable housing from the first resistance state to the second resistance state.

The sensor circuit may include at least one grip sensor disposed in the first housing and at least one grip sensor disposed in the second housing, and the processor may be configured to recognize a one-handed gripping state in which a user is gripping the portable electronic device with one hand, based on the data received from the sensor circuit, and, in response to recognizing the one-handed gripping state and the opening or closing state of the foldable housing, control the at least one motor to switch the foldable housing from the first resistance state to the second resistance state. "Based on" as used herein covers based at least on.

The sensor circuit may include a first inertial sensor disposed in the first housing, a second inertial sensor disposed in the second housing, and a Hall sensor disposed in the first housing, the second housing, or the hinge assembly, and the processor may be configured to calculate a direction of a force applied to the first housing, a direction of a force applied to the second housing, and an angle between the first housing and the second housing using data received from the first inertial sensor and the second inertial sensor, calculate strength of magnetic field using data received from the Hall sensor, recognize, if the direction of the force applied to the first housing and the direction of the force applied to the second housing are opposite, if the angle is greater than or equal to a first threshold angle, and if the strength is less than a first threshold value, that the foldable housing is opening, and recognize, if the direction of the force applied to the first housing and the direction of the force applied to the second housing are opposite, if the angle is less than a second threshold angle, which is greater than the first threshold angle, and if the strength is greater than or equal to a second threshold value, which is less than the threshold value, that the foldable housing is closing. The first threshold angle and the first threshold value may correspond to a folded state of the foldable housing. The second threshold angle and the second threshold value may correspond to an unfolded state of the foldable housing.

The sensor circuit may include a first inertial sensor disposed in the first housing, a second inertial sensor disposed in the second housing, and a Hall sensor disposed in the first housing, the second housing, or the hinge assembly, and the processor may be configured to calculate a direction of a force applied to the first housing, a direction of a force applied to the second housing, and an angle between the first housing and the second housing using data received from the first inertial sensor and the second inertial sensor, calculate strength of magnetic field using data received from the Hall sensor, recognize, if the direction of the force applied to the first housing and the direction of the force applied to the second housing are opposite, if the angle falls within a first angle range, and if the strength falls within a first strength range, that the foldable housing is opening, and recognize, if the direction of the force applied to the first housing and the direction of the force applied to the second housing are opposite, if the angle falls within a second angle range, and if the strength falls within a second strength range, that the foldable housing is closing. The first angle range and the first strength range may correspond to a folded state of the foldable housing, and the second angle range and the second strength range may correspond to an unfolded state of the foldable housing.

The processor may be configured to calculate an angle between the first housing and the second housing using the data received from the sensor circuit and, if the angle falls within a first angle range or a second angle range, control the at least one motor to switch the foldable housing from the second resistance state to the first resistance state. The first angle range may correspond to a folded state of the foldable housing. The second angle range may correspond to an unfolded state of the foldable housing.

The hinge assembly (e.g., the hinge assembly 300 in FIG. 3) may further include a first arm structure including a first coupling member coupled to the first housing and a first cam rotating about a first axis, and a second arm structure including a second coupling member coupled to the second housing and a second cam rotating about a second axis parallel to the first axis. The at least one motor may include a first motor and a second motor. The detent structure may include a first detent part and a second detent part. The first detent part may be configured to come into contact with the first cam along the first axis to restrict rotation of the first cam and to be separated from the first cam by power transferred from the first motor to enable the first cam to freely rotate. The second detent part may be configured to come into contact with the second cam along the second axis to restrict rotation of the second cam and to be separated from the second cam by power transferred from the second motor to enable the second cam to freely rotate. The first detent part may include a first contact portion, a first nut portion having a female thread formed on a cylindrical inner wall thereof, and a first bolt portion having a male thread formed on a cylindrical outer wall thereof to be screwed to the first nut portion, coupled to the first contact portion through a 1-1st opening of the first nut portion, and coupled to a first shaft through a 1-2nd opening formed on the opposite side of the 1-1st opening. The second detent part may include a second contact portion, a second nut portion having a female thread formed on a cylindrical inner wall thereof, and a second bolt portion having a male thread formed on a cylindrical outer wall thereof to be screwed to the second nut portion, coupled to the second contact portion through a 2-1st opening of the second nut portion, and coupled to a second shaft through a 2-2nd opening formed on the opposite side of the 2-1st opening. The first bolt portion may move toward the first cam while rotating by power transferred from the first motor through the first shaft such that the first contact portion comes into contact with the first cam and moves away from the first cam while reversely rotating by power transferred from the first motor through the first shaft such that the first contact portion is separated from the first cam. The second bolt portion may move toward the second cam while rotating by power transferred from the second motor through the second shaft such that the second contact portion comes into contact with the second cam and moves away from the second cam while reversely rotating by power transferred from the second motor through the second shaft such that the second contact portion is separated from the second cam. A portion of the first cam facing the first contact portion may be formed in a concavo-convex structure in which peaks and valleys are repeated. A portion of the first contact portion that comes into contact with the first cam may be formed in a concavo-convex structure in which peaks and valleys are repeated. A portion of the second cam facing the second contact portion may be formed in a concavo-convex structure in which peaks and valleys are repeated. A portion of the second contact portion that comes into contact with the second cam may be formed in a concavo-convex structure in which peaks and valleys are repeated. The hinge assembly may further include a first spring configured to provide elastic force to the first contact portion of the first detent part and a second spring configured to provide elastic force to the second contact portion of the second detent part.

The hinge assembly (e.g., the hinge assembly 400 in FIG. 4) may further include a first arm structure including a first coupling member coupled to the first housing and a first cam rotating about a first axis, and a second arm structure including a second coupling member coupled to the second housing and a second cam rotating about a second axis parallel to the first axis. The at least one motor may include a first motor and a second motor. The detent structure may include a first detent part and a second detent part. The first detent part may be configured to come into contact with the first cam along the first axis and adjust a force pushing the first cam by power transferred from the first motor. The second detent part may be configured to come into contact with the second cam along the second axis and adjust a force pushing the second cam by power transferred from the second motor. The first detent part may include a first contact portion in contact with the first cam, a first nut portion having a female thread formed on a cylindrical inner wall thereof, and a first bolt portion having a male thread formed on a cylindrical outer wall thereof to be screwed to the first nut portion and coupled to a first shaft through a 1-1st opening of the first nut portion, a first connection portion extending from the first bolt portion, and a first spring coupled to the first connection portion through a 1-2nd opening of the first nut portion and disposed between the first connection portion and the first contact portion. The second detent part may include a second contact portion in contact with the second cam, a second nut portion having a female thread formed on a cylindrical inner wall thereof, and a second bolt portion having a male thread formed on a cylindrical outer wall thereof to be screwed to the second nut portion and coupled to a second shaft through a 2-1st opening of the second nut portion, a second connection portion extending from the second bolt portion, and a second spring coupled to the second connection portion through a 2-2nd opening of the second nut portion and disposed between the second connection portion and the second contact portion. The first shaft may rotate the first bolt portion by power transferred from the first motor to push the first connection portion toward the first cam, thereby increasing tension of the first spring, and reversely rotate the first bolt portion by power transferred from the first motor to pull the first connection portion, thereby reducing the tension of the first spring. The second shaft may rotate the second bolt portion by power transferred from the second motor to push the second connection portion toward the second cam, thereby increasing tension of the second spring, and reversely rotate the second bolt portion by power transferred from the second motor to pull the second connection portion, thereby reducing the tension of the second spring. A portion of the first cam facing the first contact portion may be formed in a concavo-convex structure in which peaks and valleys are repeated. A portion of the first contact portion that comes into contact with the first cam may be formed in a concavo-convex structure in which peaks and valleys are repeated. A portion of the second cam facing the second contact portion may be formed in a concavo-convex structure in which peaks and valleys are repeated. A portion of the second contact portion that comes into contact with the second cam may be formed in a concavo-convex structure in which peaks and valleys are repeated.

In various embodiments, a portable electronic device may include a wireless communication circuit (e.g., the wireless communication circuit 192 in FIG. 1), a foldable housing including a first housing and a second housing, a hinge assembly (e.g., the hinge assembly 240 in FIG. 2) configured to connect, directly or indirectly, the first housing and the second housing to be rotatable, a sensor circuit (e.g., the sensor circuit 510 in FIG. 5), and a processor (e.g., the processor 599 in FIG. 5) connected to the wireless communication circuit and the sensor circuit. The hinge assembly may include at least one motor and a detent structure configured to cause the foldable housing to switch from a first resistance state to a second resistance state in which resistance to the rotation is lower than that in the first resistance state using power transferred from the at least one motor. The processor may be configured to control the at least one motor to switch the foldable housing from the first resistance state to the second resistance state as a call request message is received from an external device through the wireless communication circuit and control the at least one motor to switch the foldable housing from the second resistance state to the first resistance state, based data received from the sensor circuit.

The processor may be configured to calculate an angle between the first housing and the second housing using the data received from the sensor circuit and, if the angle falls within a designated first angle range or second angle range, switch the foldable housing from the second resistance state to the first resistance state.

The call request message may include a voice call request message or a video call request message. The first angle range may be designated to correspond to the voice call request message. The second angle range may be designated to correspond to the video call request message.

The first angle range may correspond to a first state in which the foldable housing is partially folded. The second angle range may correspond to a second state in which the foldable housing is folded more than in the first state.

The embodiments of the disclosure disclosed in this specification and drawings are only presented as specific examples to easily explain the technical content according to the embodiments of the disclosure and help understanding of the embodiments of the disclosure, and are not intended to limit the scope of the embodiments of the disclosure. Therefore, the scope of various embodiments of the disclosure should be construed as including all changes or modifications derived based on the technical spirit of various embodiments of the disclosure, as well as the embodiments disclosed herein. While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. A portable electronic device comprising:
a foldable housing comprising a first housing and a second housing;
a hinge assembly, comprising a hinge, configured to connect the first housing and the second housing so that at least one of the first housing and the second housing is rotatable relative to the other of the first housing and the second housing;
a sensor circuit; and
a processor connected to the sensor circuit,
wherein the hinge assembly comprises:
at least one motor; and
a detent configured to allow the foldable housing to switch from a first resistance state to a second resistance state in which resistance to rotation is lower than that in the first resistance state using power transferred from the at least one motor, and
wherein the processor is configured to:
recognize that the foldable housing is opening and/or closing, based on data received from the sensor circuit; and
based on recognizing that the foldable housing is opening and/or closing, control the at least one motor to switch the foldable housing from the first resistance state to the second resistance state.

2. The portable electronic device of claim 1, wherein the sensor circuit comprises at least one grip sensor disposed in the first housing and at least one grip sensor disposed in the second housing, and
wherein the processor is configured to:
recognize a one-handed gripping state in which a user is gripping the portable electronic device with one hand, based on the data received from the sensor circuit; and
in response to recognizing the one-handed gripping state and the opening and/or closing state of the foldable housing, control the at least one motor to switch the foldable housing from the first resistance state to the second resistance state.

3. The portable electronic device of claim 1, wherein the sensor circuit comprises a first inertial sensor disposed in the first housing, a second inertial sensor disposed in the second housing, and a Hall sensor disposed in the first housing, the second housing, and/or the hinge assembly,
wherein the processor is configured to:
calculate a direction of a force applied to the first housing, a direction of a force applied to the second housing, and an angle between the first housing and the second housing based on data received from the first inertial sensor and the second inertial sensor;
calculate strength of magnetic field based on data received from the Hall sensor;
recognize, in case that the direction of the force applied to the first housing and the direction of the force applied to the second housing are opposite, in case that the angle is greater than or equal to a first threshold angle, and in case that the strength is less than a first threshold value, that the foldable housing is opening; and
recognize, in case that the direction of the force applied to the first housing and the direction of the force applied to the second housing are opposite, in case that the angle is less than a second threshold angle, which is greater than the first threshold angle, and in case that the strength is greater than or equal to a second threshold value, which is less than the threshold value, that the foldable housing is closing,
wherein the first threshold angle and the first threshold value correspond to a folded state of the foldable housing, and
wherein the second threshold angle and the second threshold value correspond to an unfolded state of the foldable housing.

4. The portable electronic device of claim 1, wherein the sensor circuit comprises a first inertial sensor disposed in the first housing, a second inertial sensor disposed in the second housing, and a Hall sensor disposed in the first housing, the second housing, or the hinge assembly,
wherein the processor is configured to:
calculate a direction of a force applied to the first housing, a direction of a force applied to the second housing, and an angle between the first housing and the second housing based on data received from the first inertial sensor and the second inertial sensor;
calculate strength of magnetic field based on data received from the Hall sensor;
recognize, in case that the direction of the force applied to the first housing and the direction of the force applied to the second housing are opposite, in case that the angle falls within a first angle range, and in case that the strength falls within a first strength range, that the foldable housing is opening; and
recognize, in case that the direction of the force applied to the first housing and the direction of the force applied to the second housing are opposite, in case that the angle falls within a second angle range, and in case that the strength falls within a second strength range, that the foldable housing is closing,
wherein the first angle range and the first strength range correspond to a folded state of the foldable housing, and
wherein the second angle range and the second strength range correspond to an unfolded state of the foldable housing.

5. The portable electronic device of claim 1, wherein the processor is configured to:
calculate an angle between the first housing and the second housing based on the data received from the sensor circuit; and in a case that the angle falls within a first angle range or a second angle range, control the at least one motor to switch the foldable housing from the second resistance state to the first resistance state, wherein the first angle range corresponds to a folded state of the foldable housing, and wherein the second angle range corresponds to an unfolded state of the foldable housing.

6. The portable electronic device of claim 1, wherein the hinge assembly further comprises a first arm structure comprising a first coupling member coupled to the first housing and a first cam rotating about a first axis, and a second arm structure comprising a second coupling member coupled to the second housing and a second cam for rotating about a second axis parallel to the first axis, wherein the at least one motor comprises a first motor and a second motor, wherein the detent comprises a first detent part and a second detent part, wherein the first detent part is configured to come into contact with the first cam along the first axis to restrict rotation of the first cam and to be separated from the first cam by power transferred from the first motor to enable the first cam to freely rotate, and wherein the second detent part is configured to come into contact with the second cam along the second axis to restrict rotation of the second cam and to be separated from the second cam by power transferred from the second motor to enable the second cam to freely rotate.

7. The portable electronic device of claim 6, wherein the first detent part comprises:

a first contact portion;

a first nut portion comprising a female thread formed on a cylindrical inner wall thereof; and a first bolt portion having a male thread formed on a cylindrical outer wall thereof to be screwed to the first nut portion, coupled to the first contact portion through at least a 1-1st opening of the first nut portion, and coupled to a first shaft through at least a 1-2nd opening formed on the opposite side of the 1-1st opening, wherein the second detent part comprises:

a second contact portion;

a second nut portion having a female thread formed on a cylindrical inner wall thereof; and a second bolt portion comprising a male thread formed on a cylindrical outer wall thereof to be screwed to the second nut portion, coupled to the second contact portion through at least a 2-1st opening of the second nut portion, and coupled to a second shaft through at least a 2-2nd opening formed on the opposite side of the 2-1st opening, wherein the first bolt portion is configured to move toward the first cam while rotating by power transferred from the first motor through the first shaft such that the first contact portion comes into contact with the first cam and move away from the first cam while reversely rotating by power transferred from the first motor through the first shaft such that the first contact portion is separated from the first cam, and wherein the second bolt portion is configured to move toward the second cam while rotating by power transferred from the second motor through the second shaft such that the second contact portion comes into contact with the second cam and move away from the second cam while reversely rotating by power transferred from the second motor through the second shaft such that the second contact portion is separated from the second cam.

8. The portable electronic device of claim 7, wherein a portion of the first cam facing the first contact portion is formed in a concavo-convex structure in which peaks and valleys are repeated and a portion of the first contact portion that comes into contact with the first cam is formed in a concavo-convex structure in which peaks and valleys are repeated, and wherein a portion of the second cam facing the second contact portion is formed in a concavo-convex structure in which peaks and valleys are repeated and a portion of the second contact portion that comes into contact with the second cam is formed in a concavo-convex structure in which peaks and valleys are repeated.

9. The portable electronic device of claim 8, wherein the hinge assembly further comprises a first spring configured to provide elastic force to the first contact portion of the first detent part, and a second spring configured to provide elastic force to the second contact portion of the second detent part.

10. The portable electronic device of claim 1, wherein the hinge assembly further comprises a first arm structure comprising a first coupling member coupled to the first housing and a first cam for rotating about a first axis, and a second arm structure comprising a second coupling member coupled to the second housing and a second cam for rotating about a second axis parallel to the first axis, wherein the at least one motor comprises a first motor and a second motor, wherein the detent comprises a first detent part and a second detent part, wherein the first detent part is configured to come into contact with the first cam along the first axis and adjust a force pushing the first cam by power transferred from the first motor, and wherein the second detent part is configured to come into contact with the second cam along the second axis and adjust a force pushing the second cam by power transferred from the second motor.

11. The portable electronic device of claim 10, wherein the first detent part comprises:

a first contact portion in contact with the first cam;

a first nut portion comprising a female thread formed on a cylindrical inner wall thereof; and a first bolt portion comprising a male thread formed on a cylindrical outer wall thereof to be screwed to the first nut portion and coupled to a first shaft through a 1-1st opening of the first nut portion;

a first connection portion extending from the first bolt portion; and a first spring coupled to the first connection portion through a 1-2nd opening of the first nut portion and disposed between the first connection portion and the first contact portion, wherein the second detent part comprises:

a second contact portion in contact with the second cam;

a second nut portion comprising a female thread formed on a cylindrical inner wall thereof; and a second bolt portion comprising a male thread formed on a cylindrical outer wall thereof to be screwed to the second nut portion and coupled to a second shaft through a 2-1st opening of the second nut portion;

a second connection portion extending from the second bolt portion; and a second spring coupled to the second connection portion through a 2-2nd opening of the second nut portion and disposed between the second connection portion and the second contact portion, wherein the first shaft is configured to rotate the first bolt portion by power transferred from the first motor to push the first connection portion toward the first cam, thereby increasing tension of the first spring, and reversely rotate the first bolt portion by power transferred from the first motor to pull the first connection portion, thereby reducing the tension of the first spring, and wherein the second shaft is configured to rotate the second bolt portion by power transferred from the second motor to push the second connection portion toward the second cam, thereby increasing tension of the second spring, and reversely rotate the second bolt portion by power transferred from the second motor to pull the second connection portion, thereby reducing the tension of the second spring.

12. The portable electronic device of claim 11, wherein a portion of the first cam facing the first contact portion is formed in a concavo-convex structure in which peaks and valleys are repeated and a portion of the first contact portion that comes into contact with the first cam is formed in a concavo-convex structure in which peaks and valleys are repeated, and wherein a portion of the second cam facing the second contact portion is formed in a concavo-convex structure in which peaks and valleys are repeated and a portion of the second contact portion that comes into contact with the second cam is formed in a concavo-convex structure in which peaks and valleys are repeated.

13. A portable electronic device comprising:
a wireless communication circuit;
a foldable housing comprising a first housing and a second housing;
a hinge assembly configured to rotatably connect the first housing and the second housing;
a sensor circuit; and
a processor connected to the wireless communication circuit and the sensor circuit,
wherein the hinge assembly comprises:
at least one motor; and
a detent configured to cause the foldable housing to switch from a first resistance state to a second resistance state in which resistance to rotation is lower than that in the first resistance state, and
wherein the processor is configured to:
control the at least one motor to switch the foldable housing from the first resistance state to the second resistance state based on receipt of a call request message from an external device through at least the wireless communication circuit; and
control the at least one motor to switch the foldable housing from the second resistance state to the first resistance state, based data received from the sensor circuit.

14. The portable electronic device of claim 13, wherein the processor is configured to:
calculate an angle between the first housing and the second housing based on the data received from the sensor circuit; and
in a case that the angle falls within a designated first angle range and/or second angle range, switch the foldable housing from the second resistance state to the first resistance state.

15. The portable electronic device of claim 13, wherein the call request message comprises a voice call request message or a video call request message,
wherein the first angle range is designated to correspond to the voice call request message and a first state in which the foldable housing is partially folded, and
wherein the second angle range is designated to correspond to the video call request message and a second state in which the foldable housing is folded more than in the first state.

* * * * *